(12) United States Patent
Sano et al.

(10) Patent No.: US 8,285,469 B2
(45) Date of Patent: Oct. 9, 2012

(54) CONTROL APPARATUS FOR INTERNAL COMBUSTION ENGINE INCLUDING VARIABLE VALVE OPERATING MECHANISM

(75) Inventors: Keisuke Sano, Susono (JP); Kazuhiro Wakao, Susono (JP); Takashi Nishikiori, Susono (JP); Takashi Watanabe, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 462 days.

(21) Appl. No.: 12/677,640

(22) PCT Filed: Dec. 26, 2008

(86) PCT No.: PCT/JP2008/073736
§ 371 (c)(1),
(2), (4) Date: Mar. 11, 2010

(87) PCT Pub. No.: WO2010/073369
PCT Pub. Date: Jul. 1, 2010

(65) Prior Publication Data
US 2011/0276250 A1      Nov. 10, 2011

(51) Int. Cl.
*G06F 7/00* (2006.01)
*G06F 7/02* (2006.01)
(52) U.S. Cl. ........................ 701/103; 123/690; 123/90.15
(58) Field of Classification Search .................. 701/103, 701/114, 29.2; 123/690, 90.15–90.18, 321, 123/347, 348, 198 D; 73/35.01, 114.02
See application file for complete search history.

(56) References Cited

U.S. PATENT DOCUMENTS

| | | | | |
|---|---|---|---|---|
| 6,178,934 | B1 * | 1/2001 | Hirasawa et al. | 123/90.11 |
| 7,243,532 | B2 * | 7/2007 | Tsujimura et al. | 73/114.02 |
| 2004/0010363 | A1 * | 1/2004 | Watanuki et al. | 701/114 |
| 2005/0120786 | A1 * | 6/2005 | Tsujimura et al. | 73/119 R |
| 2005/0126524 | A1 * | 6/2005 | Funke et al. | 123/90.15 |
| 2008/0114526 | A1 * | 5/2008 | Nozawa et al. | 701/103 |

FOREIGN PATENT DOCUMENTS

| | | |
|---|---|---|
| JP | 62-118031 A | 5/1987 |
| JP | 62-228640 A | 10/1987 |
| JP | 63-097855 A | 4/1988 |
| JP | 06-229881 A | 8/1994 |

(Continued)

*Primary Examiner* — Mahmoud Gimie
(74) *Attorney, Agent, or Firm* — Kenyon & Kenyon LLP

(57) ABSTRACT

The present invention has its object to provide a control apparatus for an internal combustion engine including a variable valve operating mechanism which is capable of accurately and effectively identifying an abnormality-occurring cylinder during operation while preventing the deterioration of a catalyst. A fuel injection valve which is capable of injecting fuel for each cylinder is provided. Variable valve operating mechanisms which are capable of halting the operation of the intake and exhaust valves in the closed state for each cylinder are provided. An abnormality evaluation index value is acquired during the operation of the internal combustion engine and, based on the abnormality evaluation index value, an abnormality which has occurred in at least one cylinder in the internal combustion engine is detected. When the abnormality is detected, a cylinder halting to perform the halting of fuel supply and the halting of the valve operation in the closed state is executed with a first partial cylinder made up of at least two cylinders as the target. After the cylinder halting, with the cylinder to be halted being changed, a cylinder halting is executed with a second partial cylinder made up of at least one cylinder as the target. Based on the change in the abnormality evaluation index value associated with the changing of the cylinder to be halted, the abnormality-occurring cylinder is identified.

15 Claims, 18 Drawing Sheets

FOREIGN PATENT DOCUMENTS

| | | |
|---|---|---|
| JP | 2002-201972 A | 7/2002 |
| JP | 2003-184626 A | 7/2003 |
| JP | 2007-085176 A | 4/2007 |
| JP | 2008-064077 A | 3/2008 |
| WO | WO 2006/098133 A1 | 9/2006 |

* cited by examiner

Rotational direction of cam

Explosion sequence
1→#8→#4→#3→#6→#5→#7→#2

CONTROL APPARATUS FOR INTERNAL COMBUSTION ENGINE INCLUDING VARIABLE VALVE OPERATING MECHANISM

This is a 371 national phase application of PCT/JP2008/073736 filed 26 Dec. 2008, the contents of which are incorporated herein by reference.

TECHNICAL FIELD

The present invention relates to a control apparatus for an internal combustion engine including a variable valve operating mechanism.

BACKGROUND ART

Conventionally, for example, Patent Document 1 discloses a failure determination apparatus for an internal combustion engine including a variable valve operating mechanism which can halt the operations of an intake and exhaust valves in a closed state. In this conventional failure determination apparatus, an arrangement is made such that the occurrence or nonoccurrence of misfire in the internal combustion engine is determined for each cylinder based on the rotational variation of a crankshaft.

Moreover, for example, Patent Document 2 discloses a misfire determination method of a particular cylinder in a multi-cylinder engine. In this conventional misfire determination method, an arrangement is made such that when it is determined that misfire has occurred in any of the cylinders based on predetermined misfire information (the output of an O2 sensor disposed in the downstream side of the integral part of an exhaust manifold), fuel injection to each cylinder is successively stopped from one cylinder after another. Then, when misfire information becomes not to be detected by such successive stopping of fuel supply, it is determined that a misfire has occurred in the cylinder to which fuel supply is stopped.

[Patent Document 1] Japanese Laid-open Patent Application Publication No. 2003-184626
[Patent Document 2] Japanese Laid-open Patent Application Publication No. Sho 62-228640

DISCLOSURE OF THE INVENTION

Problem to be Solved by the Invention

In Patent Document 1 described above, description is made such that the occurrence or nonoccurrence of misfire is determined for each cylinder based on the rotational variation of the crankshaft. However, in reality, it is difficult to identify a cylinder in which a misfire has occurred with enough accuracy based on the rotational variation of the crankshaft. In particular, as the number of cylinders provided in the internal combustion engine increases, and further as the engine rotational speed increases, it becomes more difficult to accurately determine from which cylinder the rotational variation of the crankshaft, which is caused by misfire, originates.

Moreover, in the method according to Patent Document 2 described above, when identifying a cylinder in which misfire has occurred, fresh air is supplied from the cylinder, to which fuel supply is stopped, to a catalyst disposed in an exhaust passage. As a result, there is a concern that the catalyst may be deteriorated. Moreover, although halting the combustion of some cylinders will be effective in identifying an abnormal cylinder, it may negatively affect the driving performance of the vehicle and the noise and vibration characteristics of the internal combustion engine. Therefore, it is desirable to reduce the number of times, at which some of the cylinders are halted in order to identify abnormal cylinders, as few as possible and to make the cylinder halting time as short as possible.

The present invention, which has been made to solve the problem as described above, has an object to provide a control apparatus for an internal combustion engine including a variable valve operating mechanism which can accurately and effectively identify a cylinder in which an abnormality has occurred during operation, while preventing the deterioration of the catalyst.

Means for Solving the Problem

A first aspect of the present invention is a control apparatus for an internal combustion engine including a variable valve operating mechanism, characterized by comprising:

a fuel injection valve which is capable of injecting fuel into each cylinder;

a variable valve operating mechanism which is capable of halting an operation(s) of at least one valve of an intake valve and an exhaust valve in a closed state independently for each cylinder;

abnormality detection means which acquires an abnormality evaluation index value during an operation of the internal combustion engine and, based on the abnormality evaluation index value, detects an abnormality which has occurred in at least one cylinder of the internal combustion engine;

first cylinder-halting execution means which, when the abnormality is detected by the abnormality detection means, executes a cylinder halting to perform a halting of fuel supply and a halting of the operation of the valve in the closed state, with a first partial cylinder made up of at least two cylinders as a target;

second cylinder-halting execution means which, after the cylinder halting by the first cylinder-halting execution means, changes cylinders to be halted, and thereafter executes a cylinder halting with a second partial cylinder made up of at least one cylinder as a target; and abnormal cylinder identification means which identifies an abnormality-occurring cylinder based on a change in the abnormality evaluation index value associated with the changing of the cylinder to be halted, by the second cylinder-halting execution means.

A second aspect of the present invention is the control apparatus for the internal combustion engine including the variable valve operating mechanism according to the first aspect of the present invention, characterized in that the second cylinder-halting execution means includes halted-cylinder-number reduction execution means which decreases a number of the cylinders to be halted as the identification of the abnormality-occurring cylinder proceeds.

A third aspect of the present invention is the control apparatus for the internal combustion engine including the variable valve operating mechanism according to the first or second aspect of the present invention, characterized in that the first cylinder-halting execution means selects one or both of two cylinder groups in which halting intervals or explosion intervals are uniform or closest to uniform, as the first partial cylinder to execute the cylinder halting;

the abnormal cylinder identification means includes abnormal cylinder-group determination means which determines whether or not the abnormality-occurring cylinder is included in one or both of the cylinder groups, based on the abnormality evaluation index value at the time of the cylinder halting targeted for the first partial cylinder;

the second cylinder-halting execution means selects a partial cylinder in the cylinder group where it is determined that the abnormality-occurring cylinder is included, as the second partial cylinder to execute the cylinder halting; and the abnormal cylinder identification means includes in-cylinder-group abnormality identification means which identifies the abnormality-occurring cylinder in the cylinder group where it is determined that the abnormality-occurring cylinder is included, based on the abnormality evaluation index value at the time of the cylinder halting targeted for the second partial cylinder.

A fourth aspect of the present invention is the control apparatus for the internal combustion engine including the variable valve operating mechanism according to the third aspect of the present invention, characterized in that when there are a plurality of another sort of cylinder groups in which halting intervals or explosion intervals are uniform or closest to uniform in the cylinder group where it is determined that the abnormality-occurring cylinder is included, the second cylinder-halting execution means selects at least one of the another sort of cylinder groups as the second partial cylinder to perform the cylinder halting;

the abnormal cylinder identification means includes second abnormal cylinder-group determination means which determines whether or not an abnormality-occurring cylinder is included in at least one of the another sort of cylinder groups, based on the abnormality evaluation index value at the time of the cylinder halting targeted for the second partial cylinder;

the second cylinder-halting execution means selects a partial cylinder in the another sort of cylinder group where it is determined that the abnormality-occurring cylinder is included, as a third partial cylinder to execute the cylinder halting; and the in-cylinder-group abnormality identification means identifies the abnormality-occurring cylinder in the another sort of cylinder group where it is determined that the abnormality-occurring cylinder is included, based on the abnormality evaluation index value at the time of the cylinder halting targeted for the third partial cylinder.

A fifth aspect of the present invention is the control apparatus for the internal combustion engine including the variable valve operating mechanism according to the first or second aspect of the present invention, characterized in that the internal combustion engine is an internal combustion engine including four cylinders;

first cylinder-halting execution means selects one of two cylinder groups made up of two cylinders between which halting intervals are uniform or closest to uniform, as the first partial cylinder to execute the cylinder halting;

the abnormal cylinder identification means includes abnormal cylinder-group determination means which determines in which of the cylinder groups the abnormality-occurring cylinder is included, based on the abnormality evaluation index value at the time of the cylinder halting targeted for the first partial cylinder;

the second cylinder-halting execution means selects any one cylinder in the cylinder group where it is determined that the abnormality-occurring cylinder is included, as the second partial cylinder to execute the cylinder halting; and the abnormal cylinder identification means includes in-cylinder-group abnormality identification means which identifies the abnormality-occurring cylinder in the cylinder group where it is determined that the abnormality-occurring cylinder is included, based on the abnormality evaluation index value at the time of the cylinder halting targeted for the second partial cylinder.

A sixth aspect of the present invention is the control apparatus for the internal combustion engine including the variable valve operating mechanism according to the first or second aspect of the present invention, characterized in that the internal combustion engine is an internal combustion engine including four cylinders;

first cylinder-halting execution means successively selects two cylinder groups made up of two cylinders between which halting intervals are uniform or closest to uniform, as the first partial cylinder to execute the cylinder halting;

the abnormal cylinder identification means includes abnormal cylinder-group determination means which determines whether or not the abnormality-occurring cylinder is included in one or both of the cylinder groups, based on the abnormality evaluation index value at the time of the cylinder halting targeted for the first partial cylinder;

the second cylinder-halting execution means selects three cylinders other than any one cylinder in the cylinder group where it is determined that the abnormality-occurring cylinder is included, as the second partial cylinder to execute the cylinder halting; and the abnormal cylinder identification means includes in-cylinder-group abnormality identification means which identifies the abnormality-occurring cylinder in the cylinder group where it is determined that the abnormality-occurring cylinder is included, based on the abnormality evaluation index value at the time of the cylinder halting targeted for the second partial cylinder.

A seventh aspect of the present invention is the control apparatus for the internal combustion engine including the variable valve operating mechanism according to the first or second aspect of the present invention, characterized in that the internal combustion engine is an internal combustion engine including six cylinders;

the first cylinder-halting execution means selects one of two cylinder groups made up of three cylinders between which explosion intervals are uniform or closest to uniform, as the first partial cylinder to execute cylinder halting;

the abnormal cylinder identification means includes abnormal cylinder-group determination means which determines in which of the cylinder groups the abnormality-occurring cylinder is included, based on the abnormality evaluation index value at the time of the cylinder halting targeted for the first partial cylinder;

the second cylinder-halting execution means selects, for at least one of three another sort of cylinder groups made up of two cylinders between which explosion intervals are uniform or closest to uniform, four cylinders other than two cylinders included in the another sort of cylinder group, as the second partial cylinder to execute the cylinder halting; and the abnormal cylinder identification means includes in-cylinder-group abnormality identification means which identifies the abnormality-occurring cylinder, based on a determination result of whether or not the abnormality-occurring cylinder is included in the another sort of cylinder group based on the abnormality evaluation index value at the time of the cylinder halting targeted for the second partial cylinder, and a determination result by the abnormal cylinder-group determination means.

An eighth aspect of the present invention is the control apparatus for the internal combustion engine including the variable valve operating mechanism according to the first or second aspect of the present invention, characterized in that the internal combustion engine is an internal combustion engine including six cylinders;

the first cylinder-halting execution means successively selects two cylinder groups made up of three cylinders between which explosion intervals are uniform or closest to uniform, as the first partial cylinder to execute the cylinder halting;

the abnormal cylinder identification means includes abnormal cylinder-group determination means which determines whether or not the abnormality-occurring cylinder is included in one or both of the cylinder groups, based on the abnormality evaluation index value at the time of the cylinder halting targeted for the first partial cylinder;

the second cylinder-halting execution means successively selects, for three another sort of cylinder groups made up of two cylinders between which explosion intervals are uniform or closest to uniform, four cylinders other than two cylinders included in the another sort of cylinder groups, as the second partial cylinder to execute the cylinder halting; and the abnormal cylinder identification means includes in-cylinder-group abnormality identification means which, when it is determined that the abnormality-occurring cylinder is included in only one of the cylinder groups, identifies the abnormality-occurring cylinder based on: a determination result of whether or not the abnormality-occurring cylinder is included in the another sort of cylinder groups, based on the abnormality evaluation index value at the time of the cylinder halting targeted for the second partial cylinder; and a determination result by the abnormal cylinder-group determination means.

A ninth aspect of the present invention is the control apparatus for the internal combustion engine including the variable valve operating mechanism according to the eighth aspect of the present invention, characterized in that the second cylinder-halting execution means further selects any one cylinder of the another sort of cylinder group where it is determined that the abnormality-occurring cylinder is included, as a third partial cylinder to execute the cylinder halting; and when it is determined that both of the cylinder groups include the abnormality-occurring cylinder, the in-cylinder-group abnormality identification means identifies the abnormality-occurring cylinder in the another sort of cylinder group where it is determined that the abnormality-occurring cylinder is included, based on the abnormality evaluation index value at the time of the cylinder halting targeted for the third partial cylinder.

A tenth aspect of the present invention is the control apparatus for the internal combustion engine including the variable valve operating mechanism according to the first or second aspect of the present invention, characterized in that the internal combustion engine is an internal combustion engine including eight cylinders;

the first cylinder-halting execution means selects one of two cylinder groups made up of four cylinders between which halting intervals are uniform or closest to uniform, as the first partial cylinder to execute the cylinder halting;

the abnormal cylinder identification means includes abnormal cylinder-group determination means which determines in which of the cylinder groups the abnormality-occurring cylinder is included, based on the abnormality evaluation index value at the time of the cylinder halting targeted for the first partial cylinder;

the second cylinder-halting execution means selects one of two another sort of cylinder groups made up of two cylinders between which halting intervals are uniform or closest to uniform, as the second partial cylinder to execute the cylinder halting, in the cylinder group where it is determined that the abnormality-occurring cylinder is included;

the abnormal cylinder identification means includes second abnormal cylinder-group determination means which determines in which of the another sort of cylinder groups the abnormality-occurring cylinder is included, based on the abnormality evaluation index value at the time of the cylinder halting targeted for the second partial cylinder;

the second cylinder-halting execution means further selects any one cylinder in the another sort of cylinder group where it is determined that the abnormality-occurring cylinder is included, as a third partial cylinder to execute the cylinder halting; and the abnormal cylinder identification means includes in-cylinder-group abnormality identification means which identifies the abnormality-occurring cylinder in the another sort of cylinder group where it is determined that the abnormality-occurring cylinder is included, based on the abnormality evaluation index value at the time of the cylinder halting targeted for the third partial cylinder.

An eleventh aspect of the present invention is the control apparatus for the internal combustion engine including the variable valve operating mechanism according to the first or second aspect of the present invention, characterized in that the internal combustion engine is an internal combustion engine including eight cylinders;

the first cylinder-halting execution means successively selects two cylinder groups made up of four cylinders between which halting intervals are uniform or closest to uniform, as the first partial cylinder to execute the cylinder halting;

the abnormal cylinder identification means includes abnormal cylinder-group determination means which determines whether or not the abnormality-occurring cylinder is included in one or both of the cylinder groups, based on the abnormality evaluation index value at the time of the cylinder halting targeted for the first partial cylinder;

the second cylinder-halting execution means successively selects, for at least two of the four another sort of cylinder groups made up of two cylinders between which halting intervals are uniform or closest to uniform, four cylinders other than the two cylinders included in the another sort of cylinder groups, as the second partial cylinder to execute the cylinder halting, in the cylinder group where it is determined that the abnormality-occurring cylinder is included;

the abnormal cylinder identification means includes second abnormal cylinder-group determination means which determines whether or not the abnormality-occurring cylinder is included in at least one of the two another sort of cylinder groups included in the cylinder group where it is determined that the abnormality-occurring cylinder is included, based on the abnormality evaluation index value at the time of the cylinder halting targeted for the second partial cylinder;

the second cylinder-halting execution means selects any one cylinder in the another sort of cylinder group where it is determined that the abnormality-occurring cylinder is included, as a third partial cylinder to execute the cylinder halting; and the abnormal cylinder identification means includes in-cylinder-group abnormality identification means which identifies the abnormality-occurring cylinder in the another sort of cylinder group where it is determined that the abnormality-occurring cylinder is included, based on the abnormality evaluation index value at the time of the cylinder halting targeted for the third partial cylinder.

A twelfth aspect of the present invention is the control apparatus for the internal combustion engine including the variable valve operating mechanism according to any one of the first to eleventh aspects of the present invention, characterized by further including:

fuel cut request determination means which determines a presence or absence of an execution request for fuel cut; and third cylinder halting execution means which executes a cylinder halting targeted for other cylinders other than a predetermined one cylinder, with the predetermined one cylinder being successively changed, when the execution request for fuel cut is recognized, and in that the abnormal cylinder identification means includes second abnormal cylinder identification means which identifies the abnormality-occurring cylinder based on the abnormality evaluation index value at the time of the cylinder halting by the third cylinder halting execution means.

A thirteenth aspect of the present invention is the control apparatus for the internal combustion engine including the variable valve operating mechanism according to the twelfth aspect of the present invention, characterized in that the abnormality detection means is means which uses an air fuel ratio of exhaust gas flowing through an exhaust passage as the abnormality evaluation index value, and detects the abnormality based on the deviation amount of the air fuel ratio with respect to a predetermined determination value, and the control apparatus for the internal combustion engine further comprises air fuel ratio correction means which corrects the air fuel ratio of the exhaust gas discharged from the abnormality-occurring cylinder identified by the second abnormal cylinder identification means so that the abnormality detected by the abnormality detection means is eliminated.

A fourteenth aspect of the present invention is the control apparatus for the internal combustion engine including the variable valve operating mechanism according to any one of the first to thirteenth aspects of the present invention, characterized in that the abnormality detection means includes:

first abnormality evaluation index value determination means which uses a rotational variation of a crankshaft as the abnormality evaluation index value and determines whether or not the rotational variation of the crankshaft is no less than a predetermined determination value; and second abnormality evaluation index value determination means which uses an air fuel ratio of exhaust gas flowing in an exhaust passage being the abnormality evaluation index value, and determines whether or not the deviation amount of the air fuel ratio is no less than a predetermined determination value, and that the control apparatus for the internal combustion engine further comprises abnormality content identification means which determines that the abnormality is a misfire when the rotational variation of the crankshaft is no less than the determination value, and that the abnormality is an air fuel ratio imbalance when, although the rotational variation of the crankshaft is not no less than the determination value, the deviation amount of the air fuel ratio is no less than the determination value.

Advantages of the Invention

According to the first aspect of the present invention, when the abnormality which has occurred in at least one cylinder of the internal combustion engine is detected based on the abnormality evaluation index value, the cylinder halting, which performs the halting of fuel supply and the halting of the operation of the valve in the closed state, is executed with the first partial cylinder made up of at least two cylinders as the target. Then, after the cylinder halting, with the cylinder to be halted being changed, the cylinder halting is executed with the second partial cylinder made up of at least one cylinder as the target. As a result of that, the abnormality evaluation index value can be changed in association with the changing of the cylinder to be halted. For example, when the partial cylinder including the abnormality-occurring cylinder is halted, the abnormality evaluation index value will not indicate the abnormality of the internal combustion engine. Therefore, by judging the change in the abnormality evaluation index value associated with the changing of the cylinder to be halted, it becomes possible to identify the abnormality-occurring cylinder. Moreover, in the present invention, the arrangement is made such that the cylinder which is first subjected to the cylinder halting is the first partial cylinder made up of at least two cylinders. As a result of this, it becomes possible to reduce the number of the cylinder halting needed for the identification of the abnormality-occurring cylinder as well as to reduce the cylinder halting time, compared with a case in which the cylinder halting is successively performed one cylinder after another. Moreover, in the present invention, the arrangement is made such that the abnormality-occurring cylinder is identified based on the change in the abnormality evaluation index value associated with the changing of the cylinder to be halted. Because of this, it is only needed for the abnormality detection means itself to have a level of accuracy for detecting the occurrence of abnormality in any of the cylinders of the internal combustion engine, and thus it becomes possible to identify the abnormality-occurring cylinder without requiring a high detection accuracy for the abnormality detection means. Further, since at the time of the cylinder halting in the present invention, the fuel supply is halted as well as the operation of the valves is halted in the closed state, it is possible to prevent air from being supplied to the catalyst from the cylinder to be halted at the time of the cylinder halting for the abnormal cylinder identification, thereby preventing the deterioration of the catalyst. As so far described, according to the present invention, it becomes possible to accurately and effectively identify the cylinder in which the abnormality has occurred during operation, while preventing the deterioration of the catalyst.

If only one cylinder of a plurality of cylinders included in the internal combustion engine is the cylinder to be halted, there is a concern that the level of the noise and vibration of the internal combustion engine increases. According to the second aspect of the present invention, since the number of cylinders to be halted is decreased as the identification of the abnormality-occurring cylinders proceeds, it is possible to decrease the time period during which only one cylinder is the cylinder to be halted. By this arrangement, it becomes possible to identify the abnormality-occurring cylinder while suppressing the deterioration of the noise and vibration characteristics of the internal combustion engine.

According to the third aspect of the present invention, first, the cylinder halting is performed with one or both of two cylinder groups as the target, and the presence or absence of the abnormality-occurring cylinder is judged for each of the cylinder groups. Then, the abnormality-occurring cylinder becomes identified in the cylinder group where it is determined that the abnormality-occurring cylinder is included. For this reason, according to the present invention, it becomes possible to effectively reduce the number of the cylinder halting needed for the identification of the abnormality-occurring cylinder. Moreover, in the present invention, the above described cylinder group is made up of cylinders between which halting intervals or explosion intervals are uniform or closest to uniform. Because of this, according to the present invention, it becomes possible to identify the abnormal cylinder while favorably suppressing the degradation of the noise and vibration characteristics at the time of the execution of the cylinder halting.

According to the fourth aspect of the present invention, when there are the plurality of another sort of cylinder groups in which halting intervals or explosion intervals are uniform or closest to uniform in the above-described cylinder group where it is determined that the abnormality-occurring cylinder(s) is (are) included, the cylinder halting is executed with at least one of the another sort of cylinder groups as the target. Then, the abnormality-occurring cylinder(s) becomes identified within the another sort of cylinder group where it is determined that the abnormality-occurring cylinder(s) is (are) included. As a result of this, according to the present invention, in internal combustion engines having many cylinders such as those of 6-cylinder type and 8-cylinder type, it is possible to effectively identify the abnormal cylinder(s) while favorably suppressing the degradation of the noise and vibration characteristics at the time of the execution of the cylinder halting.

According to the fifth aspect of the present invention, it becomes possible to effectively identify the abnormal cylinder while favorably suppressing the degradation of the noise and vibration characteristics at the time of the execution of the cylinder halting, in the case where it is assumed that the abnormality occurs only in any one cylinder in the 4-cylinder internal combustion engine.

According to the sixth aspect of the present invention, it becomes possible to effectively identify the abnormal cylinder(s) while favorably suppressing the degradation of the noise and vibration characteristics at the time of the execution of the cylinder halting, in the case where it is assumed that the abnormality occurs in the plurality of cylinders of the 4-cylinder internal combustion engine.

According to the seventh aspect of the present invention, it becomes possible to effectively identify the abnormal cylinder while favorably suppressing the degradation of the noise and vibration characteristics at the time of the execution of the cylinder halting in the case where it is assumed that the abnormality occurs only in any one cylinder in the 6-cylinder internal combustion engine. To be more specific, according to the present invention, since the abnormality-occurring cylinder is identified based on the determination result of whether or not the abnormality-occurring cylinder is included in the another sort of cylinder groups, and the determination result by the abnormal cylinder-group determination means (that is, the determination result of in which of the above-described cylinder groups the abnormality-occurring cylinder is included), it becomes possible to identify the abnormality-occurring cylinder without requiring a single-cylinder operation.

According to the eighth aspect of the present invention, it becomes possible to effectively identify the abnormal cylinder(s) without requiring a single-cylinder operation while favorably suppressing the degradation of the noise and vibration characteristics at the time of the execution of the cylinder halting, when it can be judged that the abnormality-occurring cylinder(s) is (are) included only in one of the above-described cylinder groups, in the case where it is assumed that the abnormality occurs in the plurality of cylinders of the 6-cylinder internal combustion engine.

According to the ninth aspect of the present invention, it becomes possible to effectively identify the abnormal cylinder(s) while favorably suppressing the degradation of the noise and vibration characteristics at the time of the execution of the cylinder halting, when it can be judged that the abnormality-occurring cylinder(s) is (are) included in both of the above-described cylinder groups, in the case where it is assumed that the abnormality occurs in the plurality of cylinders of the 6-cylinder internal combustion engine.

According to the tenth aspect of the present invention, it becomes possible to effectively identify the abnormal cylinder while favorably suppressing the degradation of the noise and vibration characteristics at the time of the execution of the cylinder halting, in the case where it is assumed that the abnormality occurs only in any one cylinder in the 8-cylinder internal combustion engine.

According to the eleventh aspect of the present invention, it becomes possible to effectively identify the abnormal cylinder(s) while favorably suppressing the degradation of the noise and vibration characteristics at the time of the execution of the cylinder halting in the case where it is assumed that the abnormality occurs in the plurality of cylinders of the 8-cylinder internal combustion engine.

According to the twelfth aspect of the present invention, it is possible to identify the abnormal cylinder(s) while suppressing the deterioration of the catalyst by utilizing a situation where the execution request for fuel cut is present. As a result of this, according to the present invention, it becomes possible to sufficiently ensure opportunities to detect the abnormal cylinder(s) during the operation of the internal combustion engine. Moreover, according to the present invention, it is possible to sufficiently eliminate the effect of halting a part of the cylinders on the noise and vibration characteristics by performing the identification of the abnormal cylinder(s) at the time of the execution request for fuel cut during which torque is not required of the internal combustion engine.

According to the thirteenth aspect of the present invention, it is possible to correct the air fuel ratio of the exhaust gas discharged from the cylinder where the occurrence of abnormality is recognized while suppressing the deterioration of the catalyst by utilizing a situation where the execution request for fuel cut is present.

According to the fourteenth aspect of the present invention, it becomes possible to identify whether an abnormality which has occurred in any cylinder of the internal combustion engine is a misfire or an air fuel ratio imbalance. As a result, according to the present invention, it becomes possible to accurately identify the cylinder in which a misfire or an air fuel ratio imbalance has occurred.

Figure 1:
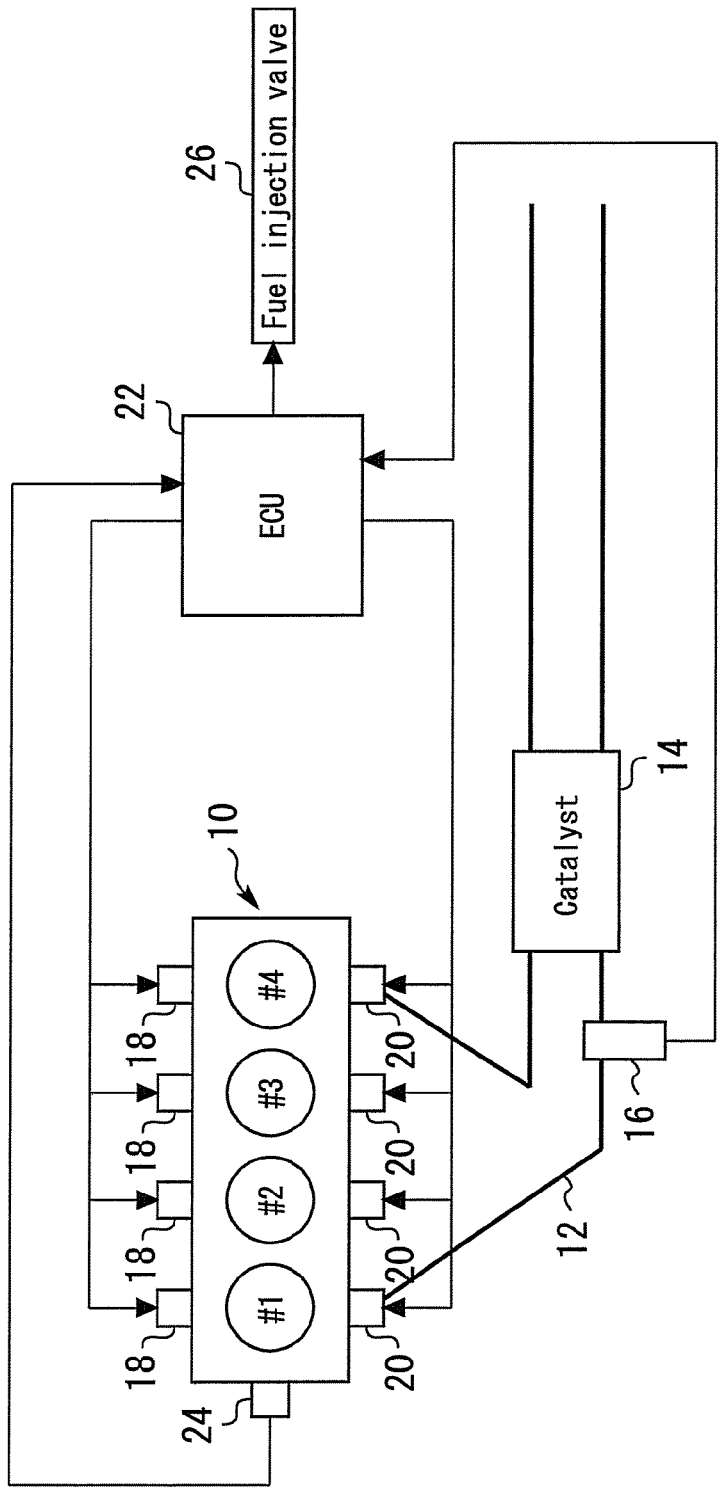
FIG. 1 is a diagram for explaining the configuration of an internal combustion engine system according to a first embodiment of the present invention.

DESCRIPTION OF SYMBOLS 10, 120, 130 internal combustion engine
12 exhaust passage
14 catalyst
16 A/F sensor
18 intake variable valve operating mechanism
20 exhaust variable valve operating mechanism
22 ECU (Electronic Control Unit)
24 crank angle sensor
26 fuel injection valve
28 valve (intake/exhaust valve)
52 camshaft
54 main cam
56 auxiliary cam
60 variable mechanism
64 changeover mechanism
106 actuator
120a, 120b, 130a, 130b bank

BEST MODE FOR CARRYING OUT THE INVENTION

First Embodiment
[Description of System Configuration]

FIG. 1 is a diagram for explaining the configuration of an internal combustion engine system according to a first embodiment of the present invention. The system of the present embodiment includes an internal combustion engine 10. Here, as shown in FIG. 1, the internal combustion engine 10 is supposed to be a straight 4-cylinder engine which includes four cylinders (No. 1 to No. 4) and in which explosion strokes are performed at uniform intervals (for example) in the order of No. 1 to No. 3, to No. 4, and to No. 2.

The internal combustion engine 10 includes an exhaust passage 12, through which exhaust gas discharged from its cylinders flows. At some point in the exhaust passage 12 (to be more specific, a portion following the point where exhaust gases from each cylinder join), a catalyst 14 for purifying exhaust gas is disposed. Moreover, in the upstream of the catalyst 14 in the exhaust passage 12, an A/F sensor 16 for detecting an air fuel ratio (A/F) of exhaust gas at that position is disposed.

The intake valves (not shown) and exhaust valves (not shown) of the internal combustion engine 10 are driven by an intake variable valve operating mechanism 18 and an exhaust variable valve operating mechanism 20, respectively. The detailed configuration of these variable valve operating mechanisms 18 and 20 will be described later with reference to FIGS. 2 to 12.

The system shown in FIG. 1 includes an ECU (Electronic Control Unit) 22. There are connected to the input of the ECU 22, various sensors for detecting the operating state of the internal combustion engine 10, such as a crank angle sensor 24 for detecting the rotational position and rotational speed of the crankshaft (engine speed) as well as the A/F sensor 16 described above. Moreover, there are connected to the output of the ECU 22, various actuators for controlling the operating state of the internal combustion engine 10, such as a fuel injection valve 26 for injecting fuel into a cylinder or an intake port of the internal combustion engine 10 as well as the variable valve operating mechanisms 18 and 20 described above. The ECU 22 can control the operating state of the internal combustion engine 10 based on those sensor outputs.

[Overall Configuration of Variable Valve Operating Mechanism]

Figure 2:
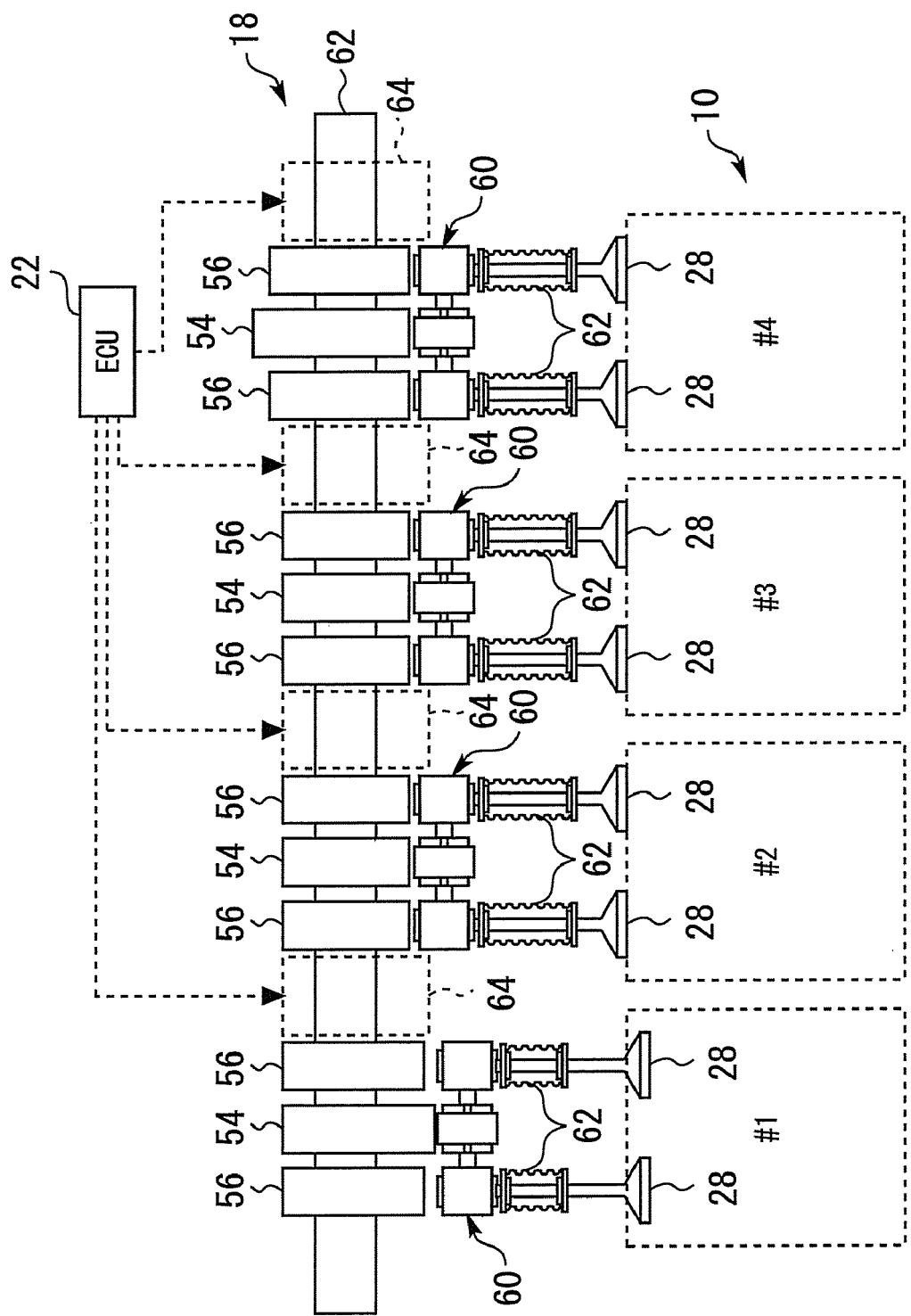
FIG. 2 is a schematic diagram showing the overall configuration of an intake variable valve operating mechanism for the internal combustion engine according to the first embodiment of the present invention.

FIG. 2 is a schematic diagram showing the overall configuration of the intake variable valve operating mechanism 18 for the internal combustion engine 10 according to the first embodiment of the present invention. Note that description will herein be made on an example of the intake variable valve operating mechanism 18, while it is assumed that the exhaust variable valve operating mechanism 20 is basically configured in the same manner as the intake variable valve operating mechanism 18.

The variable valve operating mechanism 18 of the present embodiment includes a camshaft 52. The camshaft 52 is connected to a crankshaft, which is not shown, by means of a timing chain or a timing belt and is configured to rotate at a half speed of that of the crankshaft. The camshaft 52 is formed with a main cam 54 and two auxiliary cams 56 for one cylinder. The main cam 54 is disposed between two auxiliary cams 56.

The main cam 54 includes an arc-shaped base circle part 54a (see FIG. 4) concentric with the camshaft 52, and a nose part 54b (see FIG. 4) which is formed such that a part of the base circle expands outwardly in the radial direction. Moreover, in the present embodiment, the auxiliary cam 56 is configured to be a cam which includes only a base circle part (a zero lift cam) (see FIG. 5).

A variable mechanism 60 is interposed between the cam 54, 56 and the intake valve 28 (hereafter, simply abbreviated as the "valve 28") of each cylinder. That is, the acting forces of the cams 54 and 56 are arranged to be transferred to the two valves 28 via the variable mechanism 60. The valve 28 is adapted to be opened and closed by use of the acting force of the cams 54 and 56, and the biasing force of valve spring 62. Note that the state shown in FIG. 1 represents a state in which the valve 28 of the cylinder #1 is opened by being subjected to the acting force of the main cam 54.

The variable mechanism 60 is a mechanism to change the valve-open characteristics of the valve 28 by switching between the state in which the acting force of the main cam 54 is transferred to the valve 28 and the state in which the acting force of the auxiliary cam 56 is transferred to the valve 28. Note that, in the present embodiment, since the auxiliary cam 56 is a zero-lift cam, the state in which the acting force of the auxiliary cam 56 is transferred to the valve 28 refers to a state in which neither opening nor closing of the valve 28 take place (a valve halted state).

Moreover, the variable valve operating mechanism 18 of the present embodiment includes, for each cylinder, a changeover mechanism 64 for driving each variable mechanism 60 to switch operational states of the valve 28 between a valve operable state and valve stop state. The changeover mechanism 64 is adapted to be driven according to a driving signal from an ECU (Electronic Control Unit) 22. The ECU 22 controls the changeover mechanism 64 based on the output signal of the crank angle sensor 24 and the like.

(Configuration of Variable Mechanism)

Next, a detailed configuration of the variable mechanism 60 will be described with reference to FIGS. 3 to 5.

Figure 3:
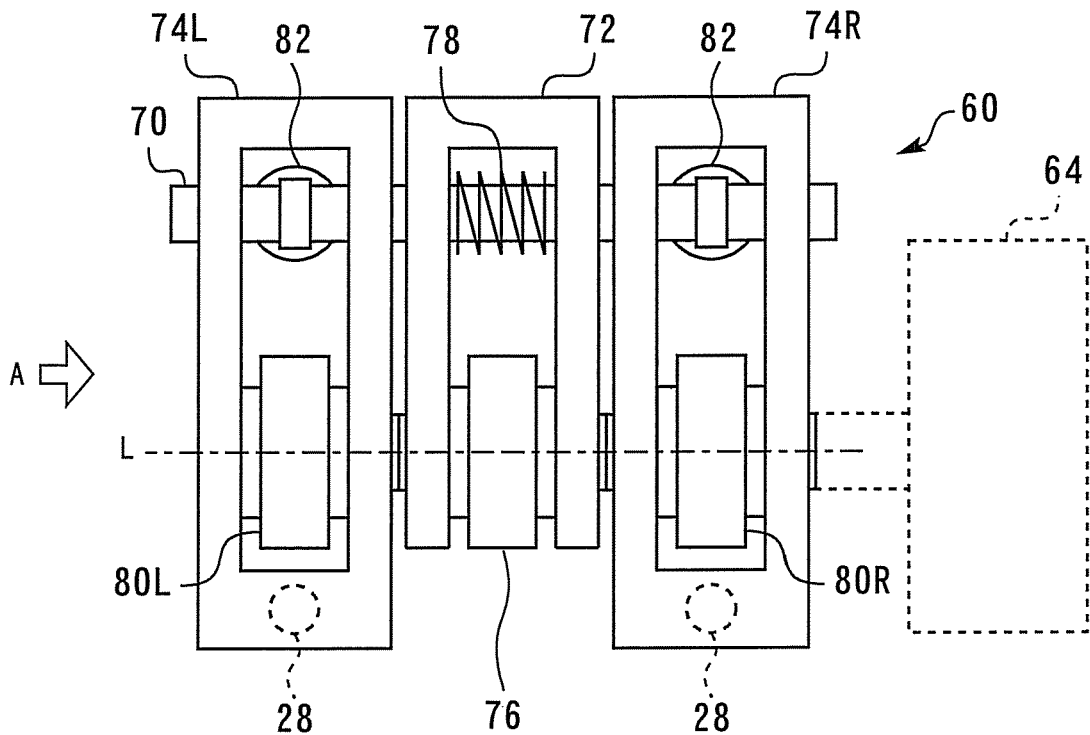
FIG. 3 is a look-down view of the variable mechanism shown in FIG. 2 seen from the proximal end part side of the valve.

FIG. 3 is a look-down view of the variable mechanism 60 shown in FIG. 2 seen from the proximal end part side of the valve 28.

The variable mechanism 60 includes a rocker shaft 70 which is disposed in parallel with the camshaft 52. As shown in FIG. 3, a first rocker arm 72 and a pair of second rocker arms 74R and 74L are rotatably attached to the rocker shaft 70. The first rocker arm 72 is disposed between the two second rocker arms 74R and 74L. Note that, in the present description, the right and left second rocker arms 74R and 74L may be referred to simply as a second rocker arm 74 when they are not particularly discriminated.

Figure 4:
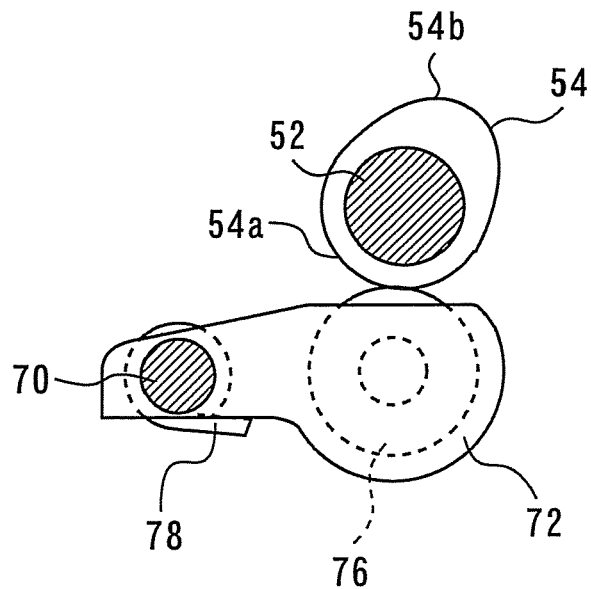
FIG. 4 is a view of a first rocker arm seen from the axial direction (the direction shown by an arrow A in FIG. 3) of a rocker shaft.
Figure 5:
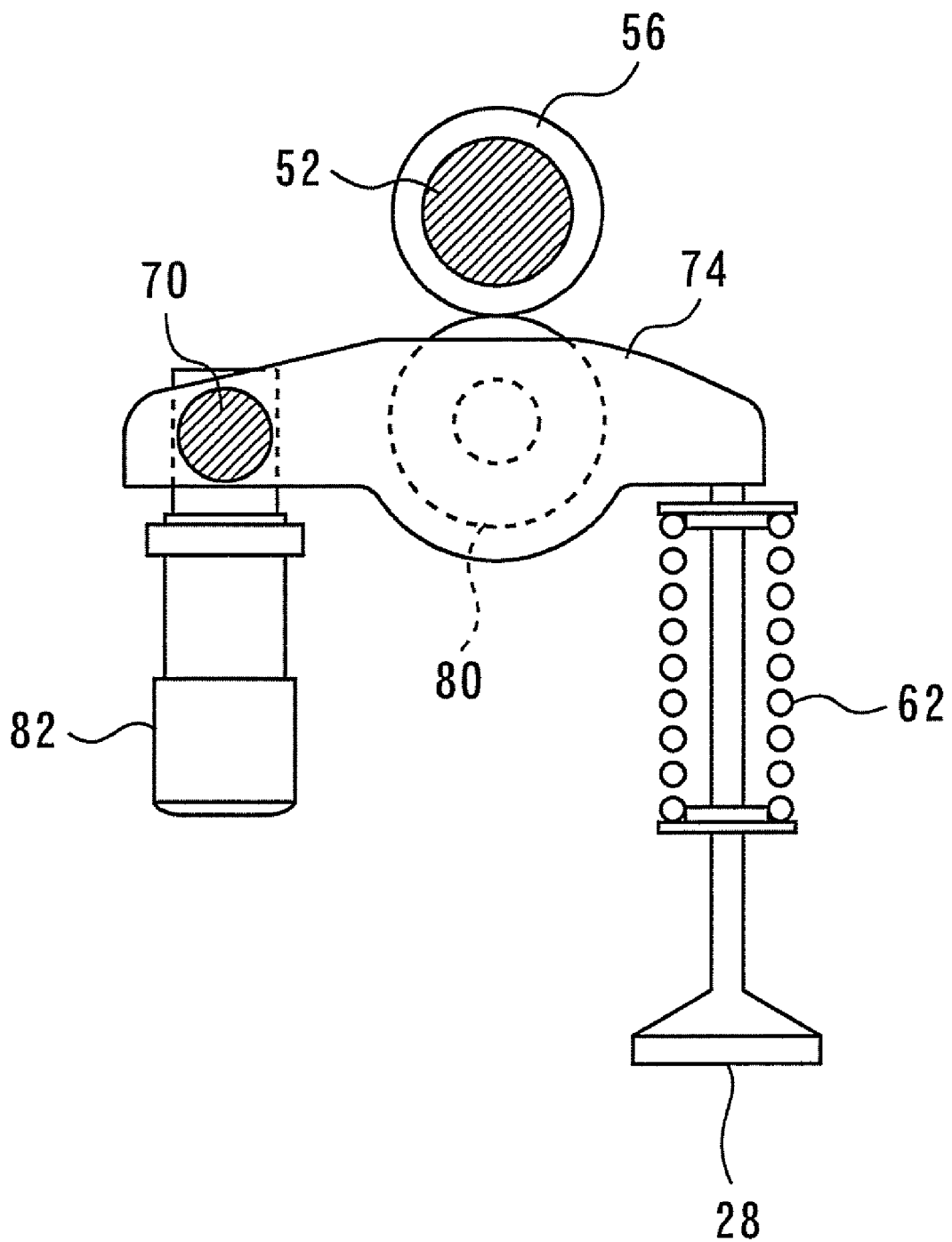
FIG. 5 is a view of a second rocker arm seen from the axial direction (the direction shown by the arrow A) of the rocker shaft in the same manner as in FIG. 4.

FIG. 4 is a view of the first rocker arm 72 seen from the axial direction (the direction shown by an arrow A in FIG. 3) of the rocker shaft 70, and FIG. 5 is a view of the second rocker arm 74 seen from the axial direction (the direction shown by the arrow A) of the rocker shaft 70 in the same manner as in FIG. 4.

As shown in FIG. 4, a first roller 76 is rotatably attached to the end part opposite to the rocker shaft 70 in the first rocker arm 72 at a position which allows a contact with the main cam 54. The first rocker arm 72 is biased by a coil spring 78 attached to the rocker shaft 70 such that the first roller 76 is constantly in abutment with the main cam 54. The first rocker arm 72 configured as described above oscillates with the rocker shaft 70 as a fulcrum through the cooperation between the acting force of the main cam 54 and the biasing force of the coil spring 78.

On the other hand, as shown in FIG. 5, the proximal end part of the valve 28 (specifically, the proximal end part of the valve stem) is in abutment with the end part opposite to the rocker shaft 70 in the second rocker arm 74. Moreover, a second roller 80 is rotatably attached to a central portion of the second rocker arm 74. Note that the outer diameter of the second roller 80 is equal to the outer diameter of the first roller 76.

Moreover, it is supposed that the rocker shaft 70 is supported by a cam carrier (or, for example, a cylinder head), which is a stationary member of the internal combustion engine 10, via a rush adjuster 82 at the other end of the second rocker arm 74. Therefore, the second rocker arm 74 is biased toward the auxiliary cam 56 by being subjected to an upward force from the rush adjuster 82.

Further, the position of the second roller 80 with respect to the first roller 76 is defined such that the axial center of the second roller 80 and the axial center of the first roller 76 are positioned on the same straight line L as shown in FIG. 3, when the first roller 76 is in abutment with the base circle part 54*a* of the main cam 54 (see FIG. 4) and the second roller 80 is in abutment with the base circle part of the auxiliary cam 56 (see FIG. 5).

(Configuration of Changeover Mechanism)

Next, a detailed configuration of the changeover mechanism 64 will be described with reference to FIGS. 6 and 7.

The changeover mechanism 64, which is a mechanism for switching the connection/disconnection concerning the first rocker arm 72 and the second rocker arm 74, makes it possible to switch the operational states of the valve 28 between the valve operable state and valve stop state (the state in which the valve 28 is halted in a closed state) by switching the state in which the acting force of the main cam 54 is transferred to the second rocker arm 74 and the state in which the forgoing acting force is not transferred to the second rocker arm 74.

Figure 6:
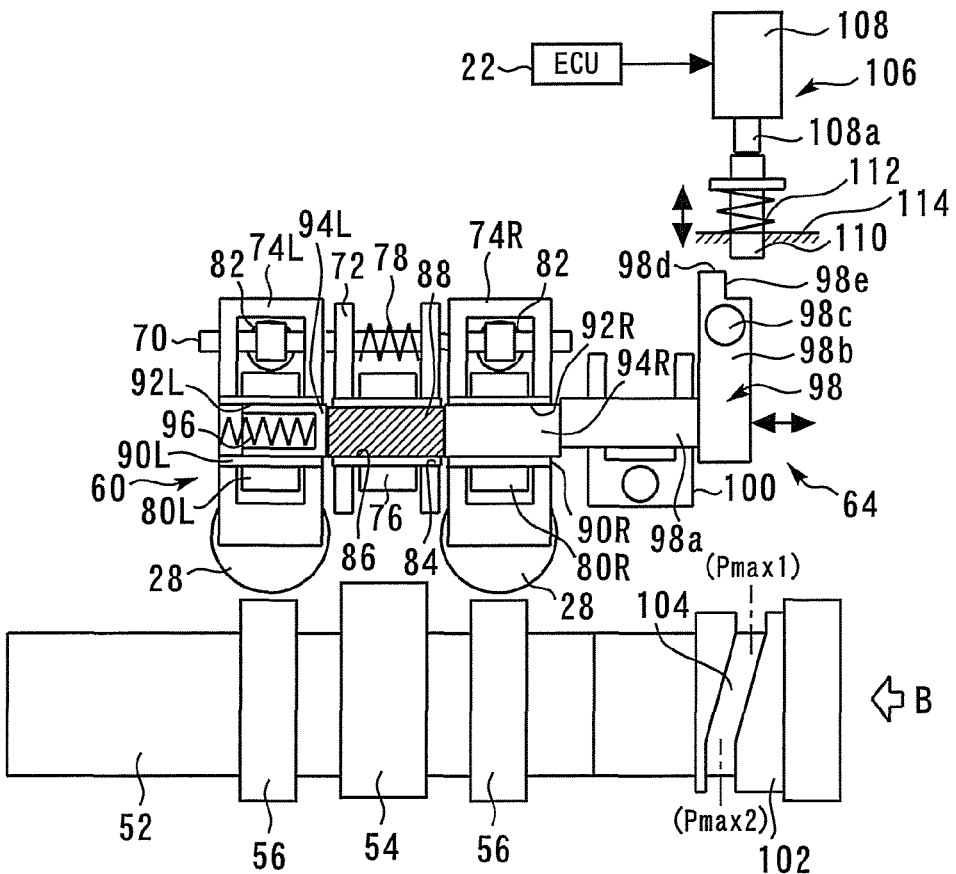
FIG. 6 is a diagram illustrating a detailed configuration of the changeover mechanism shown in FIG. 2.

FIG. 6 is a diagram illustrating a detailed configuration of the changeover mechanism 64 shown in FIG. 2. Note that, in FIG. 6, the variable mechanism 60 is represented by using a section taken at the axial centers of the rollers 76 and 80. Moreover, for the sake of simplicity of description, the mounting position of the camshaft 52 with respect to the mounting position of the variable mechanism 60 is represented in a state different from the actual mounting position excepting the axial position of the camshaft 52.

As shown in FIG. 6, a first pin hole 86 is formed within a first spindle 84 of the first roller so as to pass through in its axial direction, and the both ends of the first pin hole 86 are opened to both side surfaces of the first rocker arm 72. A first changeover pin 88 having a circular column shape is slidably inserted into the first pin hole 86. The outer diameter of the first changeover pin 88 is substantially equal to the inner diameter of the first pin hole 86, and the axial length of the first changeover pin 88 is substantially equal to the length of the first pin hole 86.

On the other hand, there is formed inside a second spindle 90L of the second roller 80 of the second rocker arm 74L side, a second pin hole 92L of which end part opposite to the first rocker aim 72 is closed and of which end part of the first rocker arm 72 side is opened. Moreover, inside a second spindle 90R of the second roller 80 of the second rocker arm 74R side, a second pin hole 92R is formed so as to pass through in its axial direction, and both ends of the second pin hole 92R are opened to the both side surfaces of the second rocker arm 74R. The inner diameters of the second pin holes 92R and 92L are equal to the inner diameter of the first pin hole 86.

A second changeover pin 94L of a circular column shape is slidably inserted into the second pin hole 92L. Moreover, inside the second pin hole 92L, there is disposed a return spring 96 which biases the second changeover pin 94L toward the first rocker arm 72 direction (hereafter, referred to as the "advancing direction of changeover pin"). The outer diameter of the second changeover pin 94L is substantially equal to the inner diameter of the second pin hole 92L. Moreover, the axial length of the second changeover pin 94L is arranged to be shorter than that of the second pin hole 92L, and an adjustment is made such that the distal end of the second changeover pin 94L slightly protrudes from the side surface of the second rocker arm 74L with the second changeover pin 94L being pressed toward inside the second pin hole 92L. Further, it is supposed that the return spring 96 is configured to, in a mounted state, constantly bias the second changeover pin 94L toward the first rocker arm 72.

A second changeover pin 94R of a circular column shape is slidably inserted into the second pin hole 92R. The outer diameter of the second changeover pin 94R is substantially equal to the inner diameter of the second pin hole 92R, and the axial length of the second changeover pin 94R is substantially equal to the length of the second pin hole 92R.

The relative positions of three pin holes 86, 92L, and 92R described so far are defined such that the axial centers of the three pin holes 86, 92L, and 92R are positioned on the same straight line L, when the first roller 76 is in abutment with the base circle part 54a of the main cam 54 (see FIG. 4) and the second roller 80 is in abutment with the base circle part of the auxiliary cam 56 (see FIG. 5).

Figure 7:
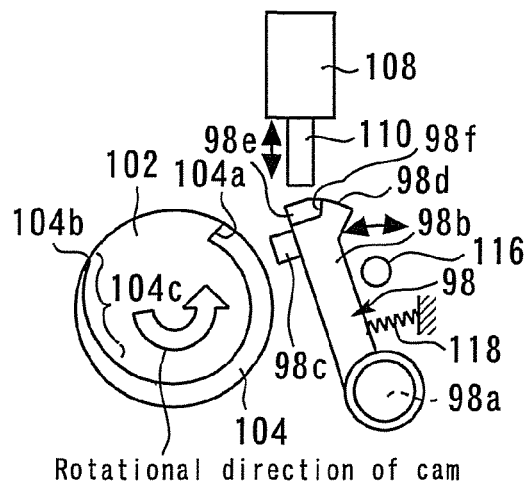
FIG. 7 is a view of the changeover mechanism seen from the axial direction of a camshaft (the direction of an arrow B in FIG. 6)

Here, newly referring to FIG. 7 as well as above-described FIG. 6, description on the changeover mechanism 64 will be continued. FIG. 7 is a view of the changeover mechanism 64 seen from the axial direction of the camshaft 52 (the direction of an arrow B in FIG. 6). Note that in the figures following FIG. 7, the relation between a rock pin 110 and a solenoid 108 may be illustrated in a simplified form.

The changeover mechanism 64 includes a slide pin 98 for forcing the changeover pins 88, 94L, and 94R to be displaced toward the second rocker arm 74L side (in the retreating direction of the changeover pin) with the aid of the rotational force of the cam. The slide pin 98 includes, as shown in FIG. 6, a circular column part 98a having a end face which is in abutment with the end face of the second changeover pin 94R. The circular column part 98a is supported by a support member 100 fixed to the cam carrier so as to be advanceable/retreatable in the axial direction and rotatable in the circumferential direction.

The distal end of the second changeover pin 94L is pressed against one end of the first changeover pin 88 by the biasing force (repulsive force) of the return spring 96. Accordingly, under a situation where the three axial centers of the above-described three pin holes 86, 92L, and 92R are positioned on the same straight line, the other end of the first changeover pin 88 is pressed against one end of the second changeover pin 94R. Further, the other end of the second changeover pin 94R is pressed against an end surface of the circular column part 98a of the slide pin 98. Thus, under the above-described specific situation, the arrangement is made such that a biasing force of the return spring 96 acts on the slide pin 98. Note that the shape and size of each component is specified such that the abutment between the second changeover pin 94R and the circular column part 98a is not interrupted when the second rocker arm 74R oscillates by being subjected to an acting force from the main cam 54.

Moreover, a bar-like arm part 98b is provided so as to protrude outwardly in the radial direction of the circular column part 98a at the end part opposite to the second changeover pin 94R in the circular column part 98a. That is, the arm part 98b is configured to be rotatable around the axial center of the circular column part 98a. The distal end part of the arm part 98b is configured, as shown in FIG. 7, to extend up to a position opposed to the peripheral surface of the camshaft 52. Moreover, a projection part 98c is provided at the distal end part of the arm part 98b so as to protrude toward the peripheral surface of the camshaft 52.

There is formed in the outer peripheral surface opposed to the projection part 98c in the camshaft 52, a large-diameter part 102 having a larger diameter than that of the camshaft 52. There is formed in the peripheral surface of the large-diameter part 102 a helical groove 104 extending in the circumferential direction. The width of the helical groove 104 is formed to be slightly larger than the outer diameter of the projection part 98c.

Moreover, the changeover mechanism 64 includes an actuator 106 for inserting the projection part 98c into the helical groove 104. To be more specific, the actuator 106 includes a solenoid 108 which is duty controlled based on the command from the ECU 22 and a lock pin 110 which is in abutment with the drive axis 108a of the solenoid 108. The lock pin 110 is formed into a cylindrical shape.

One end of the spring 112, which exerts a biasing force against the thrust of the solenoid 108, is fixedly engaged to the lock pin 110 and the other end of the spring 112 is fixedly engaged to a support member 114 fixed to the cam carrier which is a stationary member. According to such configuration, when the solenoid 108 is driven based on the command from the ECU 22, the lock pin 110 can be advanced as a result of the thrust of the solenoid 108 overpowering the biasing force of the spring 112 and, on the other hand, when the driving of the solenoid 108 is stopped, the lock pin 110 and the driving shaft 108a can be quickly retreated to a predetermined position by the biasing force of the spring 112. Moreover, the lock pin 110 is restricted from moving in its radial direction by the support member 114. As a result, even when the lock pin 110 is subjected to a force from its radial direction, the lock pin 110 can be prevented from moving in the abovementioned direction.

Moreover, it is supposed that the solenoid 108 is fixed to a stationary member such as a cam carrier, at a position where the lock pin 110 can press the pressing surface (the surface opposite to the surface where the projection part 98c is provided) 98d of the distal end part of the arm part 98b of the slide pin 98 against the helical groove 104. In other words, the pressing surface 98d is provided in a shape and at a position where the projection part 98c can be pressed toward the helical groove 104 by the lock pin 110.

The arm part 98b of the slide pin 98 is arranged to be rotatable around the axial center of the circular column part 98a within a range restricted by the large-diameter part 102 of the camshaft 52 side and a stopper 116. Then, the positional relationship of each component is arranged such that when the arm part 98b is within the abovementioned range, and when the axial position of the slide pin 98 is at a displacement end Pmax1 described later, the lock pin 110 driven by the solenoid 108 can come into abutment with the pressing surface 98d of the arm part 98b securely. Moreover, attached to the arm part 98b is a spring 118 which biases the arm part 98b toward the stopper 116. Note that such spring 118 may not necessarily be provided such as when it is not assumed that the arm part 98b may fit into the helical groove 104 by the self-weight of the slide pin 98 while the solenoid 108 is not driven.

The helical direction in the helical groove 104 of the camshaft 52 is arranged such that when the camshaft 52 is rotated in a predetermined rotational direction shown in FIG. 7 with the projection part 98c being inserted thereinto, the slide pin 98 causes the changeover pins 88, 94L, and 94R to be displaced in the direction approaching the rocker arms 72 and 74 while pushing aside them in the retreating direction against the biasing force of the return spring 96.

Here, the position of the slide pin 98, in a state where the second changeover pin 94L is inserted into both the second pin hole 92L and the first pin hole 86 by the biasing force of the return spring 96, and where the first changeover pin 88 is inserted into both the first pin hole 86 and the second pin hole 92R, is referred to as a "displacement end Pmax1". When the slide pin 98 is positioned at this displacement end Pmax1, the first rocker arm 72 and the second rocker arms 74R and 74L all become connected with each other. Moreover, the position of the slide pin 98 in a state where as a result of the changeover pin 88 and the like being subjected to a force from the slide pin 98, the second changeover pin 94L, the first changeover pin 88, and the second changeover pin 94R are respectively inserted only into the second pin hole 92L, the first pin hole 86, and the second pin hole 92R, is referred to as a "displacement end Pmax 2". That is, when the slide pin 98 is positioned at this displacement end Pmax2, the first rocker arm 72, and the second rocker arms 74R and 74L are all disconnected from each other.

In the present embodiment, the position of the proximal end 104a of the helical groove 104 in the axial direction of the camshaft 52 is arranged so as to coincide with the position of the projection part 98c when the slide pin 98 is positioned at the above-described displacement end Pmax1. Further, the position of the terminal end 104b of the helical groove 104 in the axial direction of the camshaft 52 is arranged so as to coincide with the position of the projection part 98c when the slide pin 98 is positioned at the above-described displacement end Pmax2. That is, in the present embodiment, the configuration is made such that the slide pin 98 is displacable between the displacement end Pmax1 and the displacement end Pmax2 within the range in which the projection part 98c is guided by the helical groove 104.

Further, as shown in FIG. 7, the helical groove 104 of the present embodiment is provided with a shallow groove part 104c, in which the depth of the helical groove 104 gradually decreases as the camshaft 52 rotates, as a predetermined section of the terminal end 104b side after the slide pin 98 reaches the displacement end Pmax2. Note that the depth of the portion other than the shallow groove part 104c in the helical groove 104 is constant.

Moreover, the arm part 98b in the present embodiment is provided with a notch part 98e which is formed into a concave shape by notching a part of a pressing surface 98d. The pressing surface 98d is provided so as to be kept in abutment with the lock pin 110 while the slide pin 98 is displaced from the displacement end Pmax1 to the displacement end Pmax2. Further, the notch part 98e is provided in a portion where it can be engaged with the lock pin 110 when the projection part 98c is taken out on the surface of the large-diameter part 102 by the action of the above-described shallow groove part 104c, in a state where the slide pin 98 is positioned at the above-described displacement end Pmax2.

Moreover, the notch part 98e is formed so as to be engaged with the lock pin 110 in a mode in which the rotation of the aim part 98b in the direction in which the projection part 98c is inserted into the helical groove 104 can be restricted, and the movement of the slide pin 98 in the advancing direction of the changeover pin can be restricted. To be more specific, there is provided in the notch part 98e, a guide surface 98f which guides the slide pin 98 to move away from the large-diameter part 102 as the lock pin 110 moves into the notch part 98e.

[Operation of Variable Valve Operating Mechanism]

Next, the operation of the variable valve operating mechanism 18 will be described with reference to FIGS. 8 to 12.

(At the Time of Normal Lift Operation)

Figure 8:
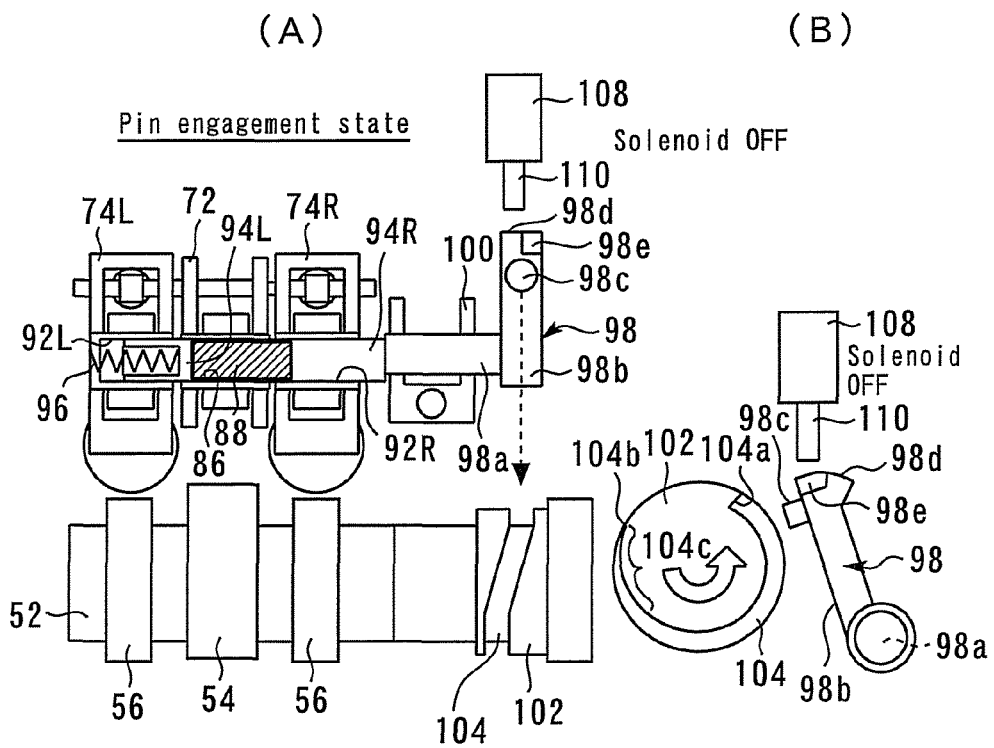
FIG. 8 is a diagram showing a control state during a valve operable state (normal lift operation)

FIG. 8 is a diagram showing a control state during valve operable state (normal lift operation).

In this case, as shown in FIG. 8(B), the driving of the solenoid 108 is turned OFF and thus the slide pin 98 is positioned at the displacement end Pmax1 being separated from the camshaft 52 and subjected to the biasing force of the return spring 96. In this state, as shown in FIG. 8(A), the first rocker arm 72 and the two second rocker arms 74 are connected via the changeover pins 88 and 94L. As a result of that, the acting force of the main cam 54 is transferred from the first rocker arm 72 to both the valves 28 via the left and right second rocker arms 74R and 74L. Thus, the normal lift operation of the valve 28 is performed according to the profile of the main cam 54.

(At the Start of Valve Stop Operation (the Start of Slide Operation))

Figure 9:
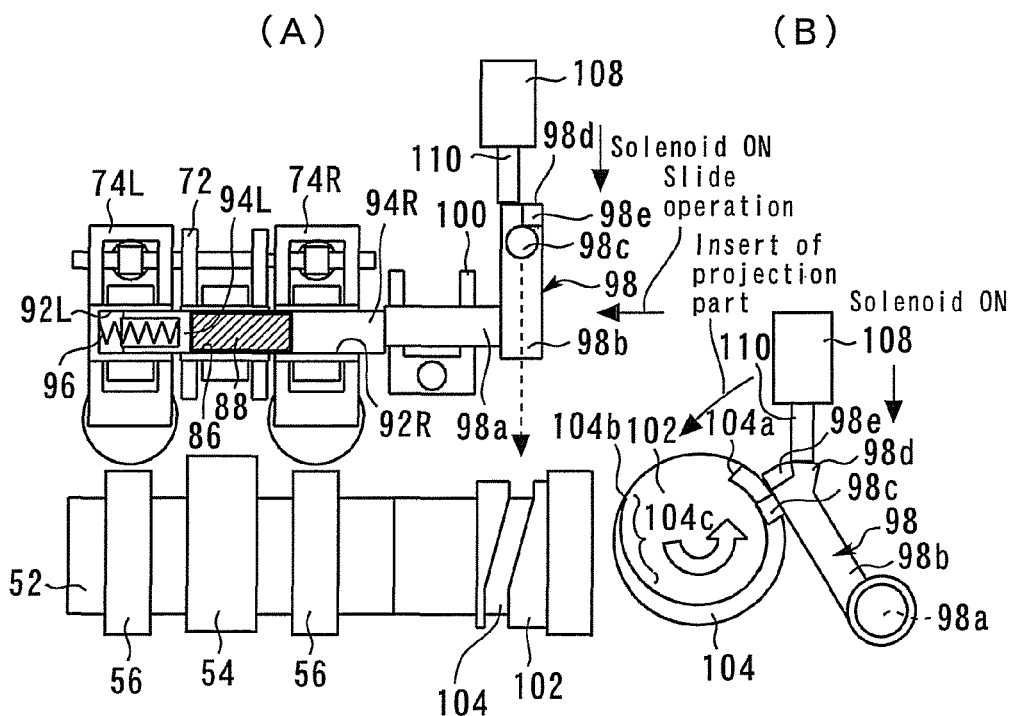
FIG. 9 is a diagram showing a control state at the start of a valve stop operation.

FIG. 9 is a diagram showing a control state at the start of a valve stop operation.

The valve stop operation is performed when, for example, an execution request of a predetermined valve stop operation such as a fuel cut request of the internal combustion engine 10 is detected by the ECU 22. Since such valve stop operation is an operation to displace the changeover pins 88, 94L, and 94R in their retreating direction by means of the slide pin 98 with the aid of the rotational force of the camshaft 52, such operation needs to be performed while the axial centers of these changeover pins 88, 94L, and 94R are positioned on the same straight line, that is, while the first rocker arm 72 is not oscillating.

In the present embodiment, the helical groove 104 is arranged such that the section within which the slide pin 98 performs a slide operation in the retreating direction of changeover pins corresponds to the base circle section of the main cam 54. As a result of this, when the ECU 22 detects an execution request for a predetermined valve stop operation, with the solenoid 108 being driven in the order starting from a cylinder at which the base circle section first arrives, as shown in FIG. 9(B), the projection part 98c is inserted into the helical groove 104, thereby successively starting the valve stop operation of each cylinder. Then, as the projection part 98c which has been inserted into the helical groove 104 being guided by the helical groove 104, a slide operation of the slide pin 98 is started toward the displacement end Pmax2 side, as shown in FIG. 9(A), with the aid of the rotational force of the camshaft 52.

(At the Completion of Slide Operation)

Figure 10:
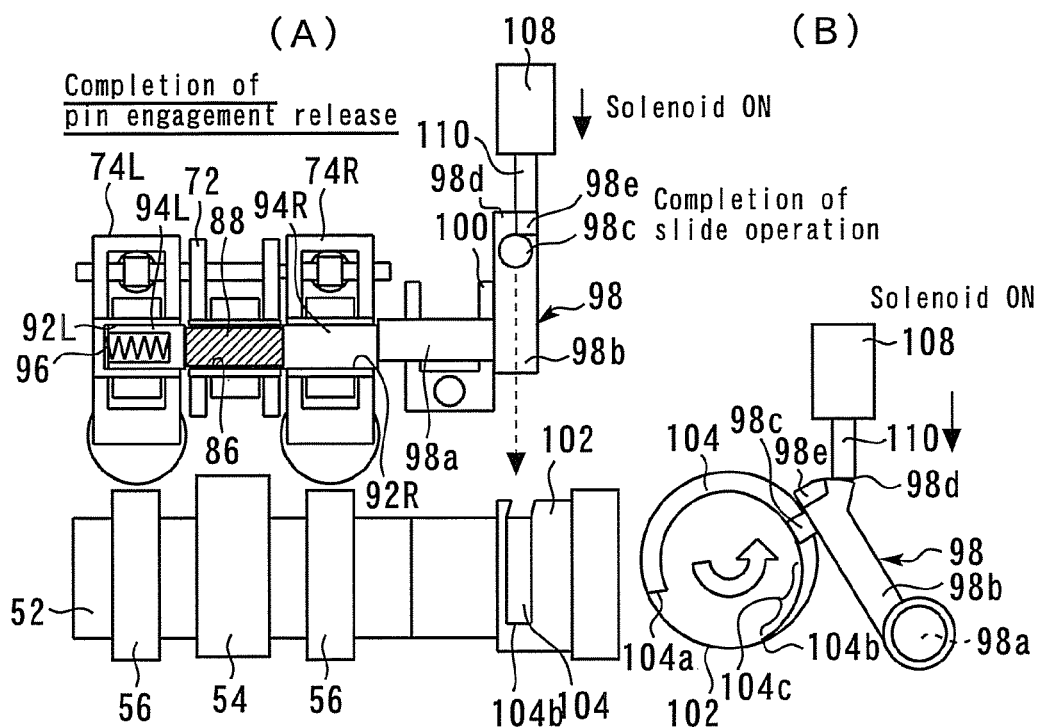
FIG. 10 is a diagram showing a control state at the completion of a slide operation.

FIG. 10 is a diagram showing a control state at the completion of the slide operation.

During the execution of the slide operation, the slide pin 98 moves toward the displacement end Pmax2, in a state in which the biasing force of the return spring 96 is received by the projection part 98c being in abutment with the side surface of the helical groove 104. FIG. 10(A) shows a timing at which the slide pin 98 has reached the displacement end Pmax2 and the slide operation at the time of a valve stop request is completed, that is, a timing at which the connection between the first rocker arm 72 and the second rocker arms 74R and 74L is released as a result of the first changeover pin 88 and the second changeover pin 94L becoming accommodated into the first pin hole 86 and the second pin hole 92L, respectively. Moreover, at this timing, as shown in FIG. 10(B), the position of the projection part 98c within the helical groove 104 has not yet reached the shallow groove part 104c.

When the slide operation is completed as shown above, and the first rocker arm 72 and the second rocker arms 74R and 74L become separated, the first rocker arm 72, which is biased by the coil spring 78 toward the main cam 54 as the main cam 54 rotates, comes to oscillate by itself. As a result of this, the acting force of the main cam 54 is not transferred to the two second rocker arms 74. Further, since the auxiliary cam 56, against which the second rocker arm 74 abuts, is a zero lift cam, the force for driving the valve 28 is no more provided to the second rocker arms 74, to which the acting force of the main cam 54 has come not to be transferred. As a result of that, since, regardless of the rotation of the main cam 54, the second rocker arm 74 comes into a stationary state, the lift operation of the valve 28 becomes stopped.

Note that when only the first rocker arm 72 oscillates, the axial centers of the first changeover pin 88 and the second changeover pins 94L and 94R are deviated. In order to secure a smooth operation of first rocker arm 72 and the second rocker arms 74, a part of the end surfaces of the first changeover pin 88 and a part of the end surfaces of the second changeover pins 94L and 94R needs to be in abutment with each other when such a deviation occurs. For this reason, in the present embodiment, the shapes and sizes of the end surfaces of the first changeover pin 88 and the second changeover pins 94L and 94R are defined so as to satisfy the above-described condition.

(At the Time of Holding Operation of Displacement Member)

Figure 11:
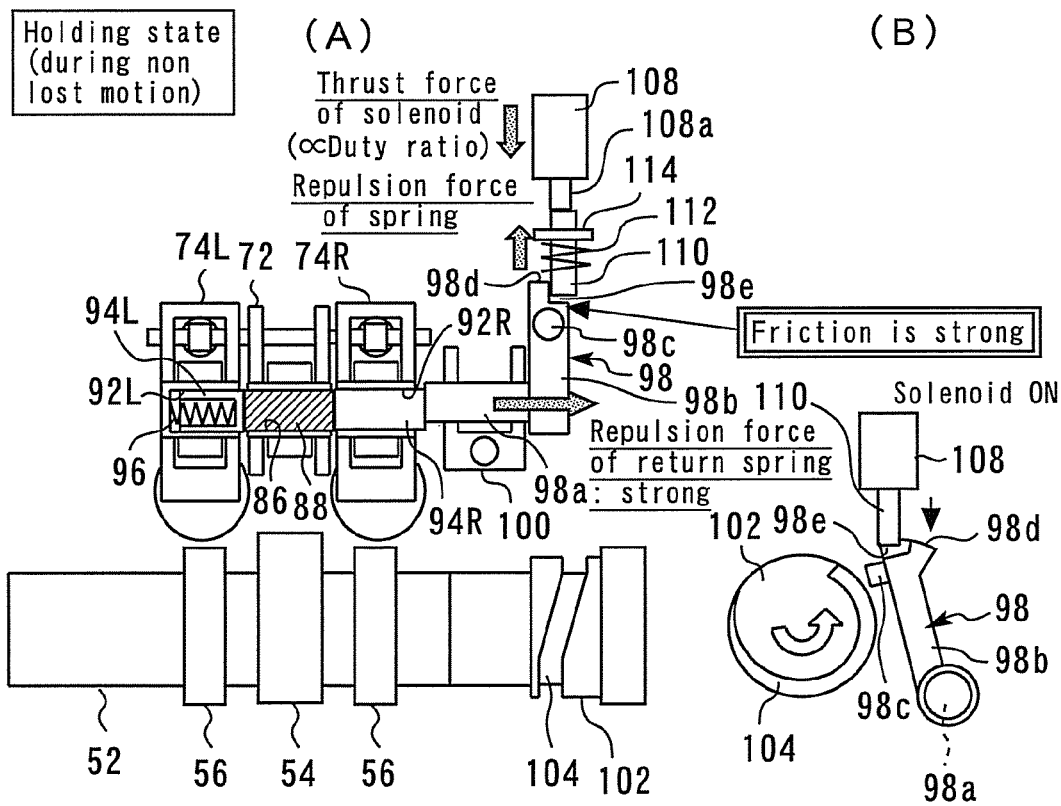
FIG. 11 is a diagram showing a control state at the time of holding operation to hold a slide pin with a lock pin.
Figure 12:
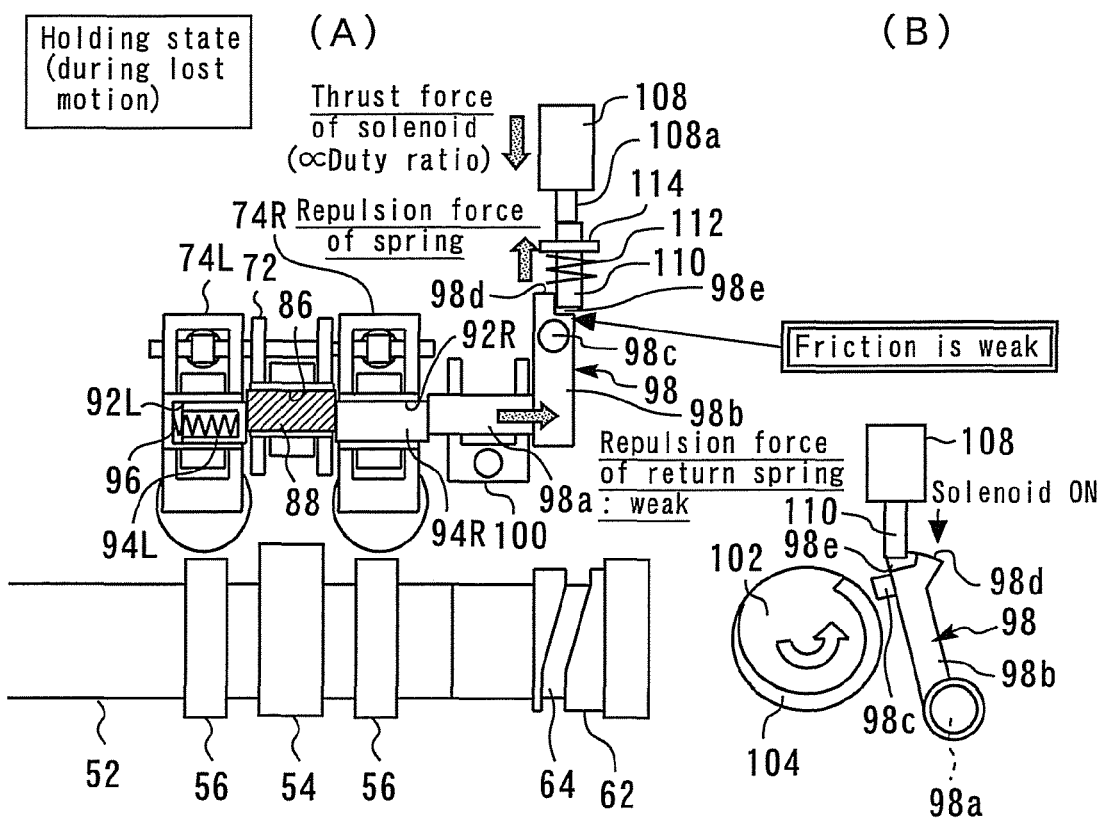
FIG. 12 is a diagram showing the control state at the time of the holding operation to hold the slide pin with the lock pin.

FIGS. 11 and 12 are diagrams showing a control state at the time of holding operation to hold the slide pin 98 with the lock pin 110. To be more specific, FIG. 11 shows a state in which the first rocker arm 72 is not performing an oscillating operation (lift operation), while FIG. 12 shows a state in which the first rocker arm 72 is performing the oscillating operation (lift operation).

When the camshaft 52 further rotates after the slide operation shown in above-described FIG. 10 is completed, the projection part 98c comes close to the shallow groove part 104c in which the depth of the groove gradually decreases. As a result of that, the action of the shallow groove part 104c causes the slide pin 98 to rotate in the direction separated from the camshaft 52. Then, as the depth of the groove decrease due to the shallow groove part 104c, the lock pin 110 is displaced a little in its retreating direction. Thereafter, when the slide pin 98 further rotates until the lock pin 110 which is constantly driven by the solenoid 108, coincides with the notch part 98e, the portion of the slide pin 98 side, which is to be abutment with the lock pin 110, is switched from the pressing surface 98d to the notch part 98e.

As a result of that, the lock pin 110 comes to be engaged with the notch part 98e. As a result of this, as shown in FIGS. 11(B) and 12(B), the slide pin 98 comes to be held with the projection part 98c being separated from the camshaft 52, and with the biasing force of the return spring 96 being received by the lock pin 110. For this reason, in this holding operation, as shown in FIGS. 11(A) and 11(B), the state in which the first rocker arm 72 and the second rocker arm 74 are separated, that is, the valve stop state is maintained.

(At the Time of Valve Return Operation)

A valve return operation for returning the operation from the valve stop state to a state in which the normal lift operation is performed is executed, for example, when an execution request of a predetermined valve return operation such as a request for returning from a fuel cut is detected by the ECU 22. Such valve return operation is started by the ECU 22 turning OFF the energization to the solenoid 108 at a predetermined timing (a timing that is earlier than the start timing of the base circle section, in which the changeover pin 88 and the like are movable, by a predetermined time period needed for the operation of the solenoid 108), in a control state shown in FIG. 11. When the energization to the solenoid 108 is turned OFF, the engagement between the notch part 98e of the slide pin 98 and the lock pin 110 is released. As a result of that, the force to hold the first changeover pin 88 and the second changeover pins 94L respectively in the first pin hole 86 and the second pin hole 92L against the biasing force of the return spring 96 disappears.

Because of this, when the base circle section in which the positions of changeover pins 88, 94L, and 94R coincide arrives, the changeover pins 88 and 94L moves in the advancing direction by the biasing force of the return spring 96, thereby returning into a state in which the first rocker arm 72 and the two second rocker arms 74 are connected via the changeover pins 88 and 94L, that is, a state in which a lift operation of the valve 28 is enabled by the acting force of the main cam 54. Moreover, as the changeover pins 88 and 94L moves in the advancing direction by the biasing force of the return spring 96, the slide pin 98 is returned from the displacement end Pmax2 to the displacement end Pmax1 via the second changeover pin 94R.

(Summary)

According to the variable valve operating mechanism 18 of the present embodiment thus configured, it becomes possible to switch the operational states of the valve 28 between the valve operable state and the valve stop state by moving the axial position of the slide pin 98 between the displacement end Pmax1 and the displacement end Pmax2, with the aid of the ON and OFF of the energization of the solenoid 108, the rotational force of the camshaft 52, and the biasing force of the return spring 96.

To be more specific, when the valve stop request is made, by turning ON the energization of the solenoid 108 thereby inserting the projection part 98c into the helical groove 104, it is made possible to move the changeover pin 88 and the like in the retreating direction of changeover pin with the slide pin 98 which utilizes the rotational force of the camshaft 52. As a result of that, it becomes possible to quickly switch the first rocker arm 72 and the two second rocker arms 74 from a connected state to a disconnected state within one base circle section. This makes it possible to obtain the valve stop state. Moreover, when a valve return request is made, by turning OFF the energization of the solenoid 108 thereby releasing the engagement between the slide pin 98 and the lock pin 110, it is made possible to move the changeover pin 88 and the like and the slide pin 98 in the advancing direction of changeover pin, with the aid of the biasing force of the return spring 96. As a result of that, it becomes possible to quickly switch the first rocker arm 72 and the two second rocker arms 74 from the disconnected state to the connected state within one base circle section, and also to return the slide pin 98 to an original position (Pmax1) at which the valve stop operation can be started. This makes it possible to resume the operational state of the valve 28 to the valve operable state.

[Abnormal Cylinder Identification Methodology of the First Embodiment]

In the internal combustion engine 10, abnormalities such as a misfire and an imbalance of air fuel ratio with respect to other cylinders may occur. There is a known technique which successively halts the combustion of each cylinder in order to identify a cylinder in which such an abnormality has occurred. However, although halting the combustion of a part of the cylinders is effective in identifying an abnormal cylinder, it may negatively affect the driving performance of the vehicle and the noise and vibration characteristics of the internal combustion engine. Therefore, it is desirable to reduce the number of times, at which a part of the cylinders are halted in order to identify abnormal cylinders, to as few as possible, and to make the cylinder halting time as short as possible. Moreover, if no measure has been taken when combustion is halted in a part of the cylinders, the air taken into the halted cylinder may be discharged as it is to the catalyst, thereby raising a concern that the catalyst is deteriorated.

According to the variable valve operating mechanisms 18 and 20 described above, it becomes possible to halt the valve 28 (intake/exhaust valve) in a closed state independently for each cylinder by separately controlling the energization of a solenoid 108 of each cylinder. Accordingly, in the present embodiment, an arrangement is made such that when halting the combustion (fuel supply) in a part of the cylinders to identify abnormal cylinders, the variable valve operating mechanisms 18 and 20 configured as described above are used to halt the operation of the intake and exhaust valves in the closed state in the target cylinder to be halted.

In addition, in the present embodiment, an arrangement is made such that when it is recognized that the abnormality has occurred in any cylinder during the operation of the internal combustion engine 10 based on a predetermined abnormality evaluation index value (a rotational variation of the crankshaft and a deviation of the air fuel ratio), first, a cylinder halting (specifically, the halting of fuel supply and the halting of the intake and exhaust valve operations in the closed state) is executed with a (first) partial cylinder made up of not a single cylinder but two cylinders as the target. Then, following the above-described cylinder halting, a cylinder halting is executed after the cylinder to be halted is changed with a (second) partial cylinder made up of a single cylinder as the target. Thereafter, an abnormality-occurring cylinder is identified based on a change in the abnormality evaluation index value associated with such changing of the cylinder to be halted.

To be more specific, in the present embodiment, an arrangement is made such that when it is recognized, based on the predetermined abnormality evaluation index value, that abnormality has occurred in any of the cylinders during the operation of the internal combustion engine 10, cylinder halting is executed by selecting one of two cylinder groups (No. 1 and No. 4 cylinders, or No. 2 and No. 3 cylinders) in which halting intervals (explosion intervals) are uniform, as the above-described (first) partial cylinder. Then, based on the abnormality evaluation index value at the time of the cylinder halting, whether or not the abnormal phenomenon disappears in association with the cylinder halting is determined for each of the above-described cylinder groups. Further, an arrangement is made such that with only one cylinder in the cylinder group, in which it is judged that an abnormality-occurring cylinder is included, being halted, the abnormality-occurring cylinder is identified based on the abnormality evaluation index value at the time of the cylinder halting.

Figure 13:
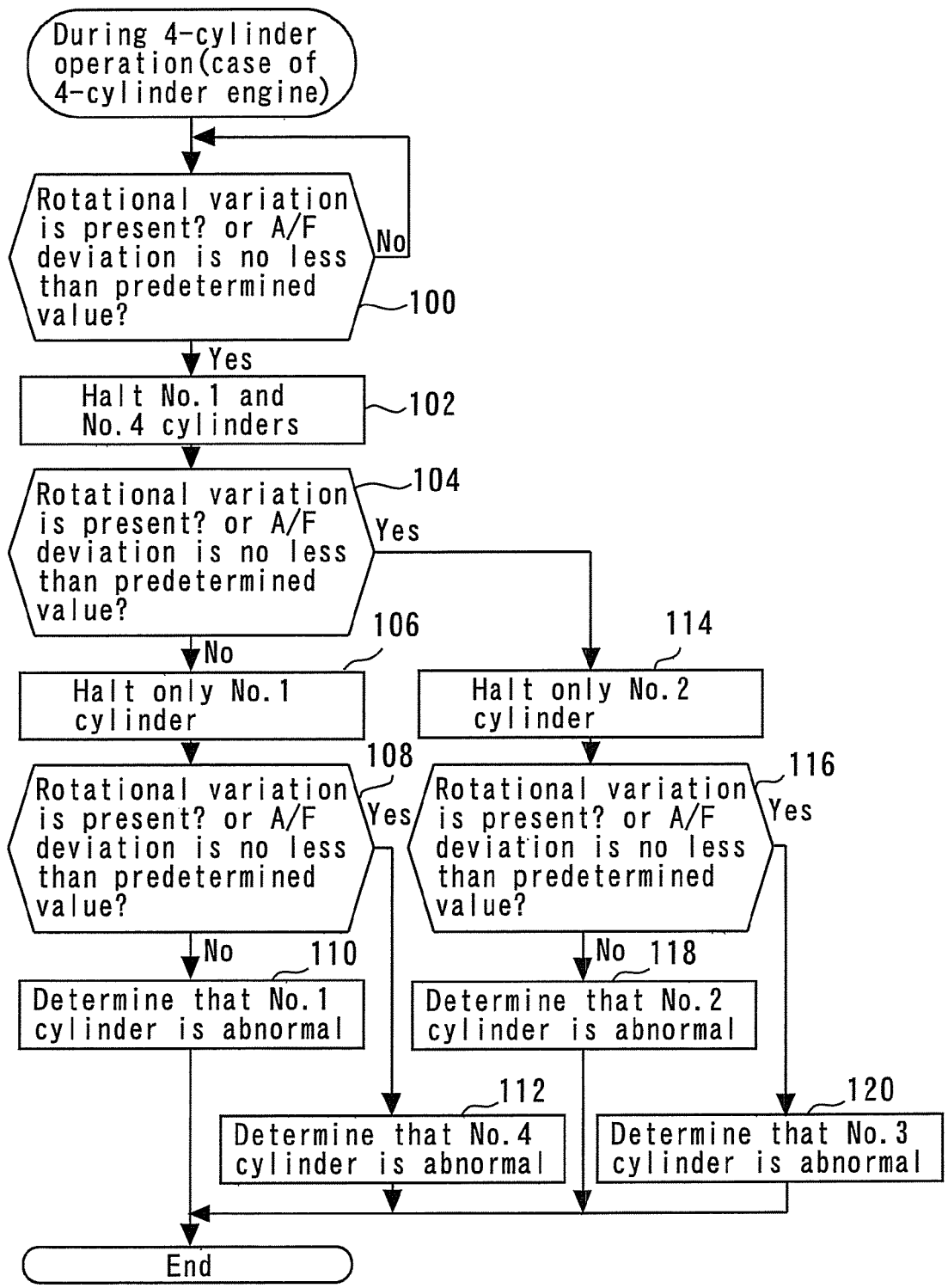
FIG. 13 is a flowchart illustrating a routine that is executed according to the first embodiment of the present invention.

FIG. 13 is a flowchart of the routine executed by the ECU 22 to implement an abnormal cylinder identification method in the first embodiment of the present invention. Note that the present routine is supposed to be executed when the internal combustion engine 10 which is a 4-cylinder engine is performing a 4-cylinder (all-cylinder) operation. Moreover, in the present embodiment, description will be made on the processing which assumes a case in which abnormality occurs only in any one of the four cylinders included in the internal combustion engine 10.

In the routine shown in FIG. 13, first, it is determined whether or not a rotational variation of the crankshaft detected by the crank angle sensor 24 is no less than a predetermined value, or whether or not the air fuel ratio detected by the A/F sensor 16 at the integral part of the exhaust manifold has deviated by no less than a predetermined value with respect to a predetermined control target air fuel ratio (for example, a theoretical air fuel ratio) (step 100). When an abnormality (misfire) has occurred in any cylinder of the internal combustion engine 10, a rotational variation of the crankshaft occurs in association with the occurrence of such abnormality. As a result of this, by determining whether or not the rotational variation of the crankshaft is no less than the predetermined value for misfire detection, it is possible to judge whether or not an abnormality such as misfire has occurred in any of the cylinders which are currently in operation. Further, when an abnormality (a misfire or an imbalance of the air fuel ratio) has occurred in any of the cylinders of the internal combustion engine 10, a deviation in the detection value of the A/F sensor 16 with respect to the control target air fuel ratio will take place in association with such occurrence of abnormality. For this reason, by determining whether or not the deviation in the detection value of the A/F sensor 16 with respect to the control target air fuel ratio is no less than the predetermined value for abnormality detection, it is possible to judge whether or not an abnormality such as a misfire or an imbalance of the air fuel ratio has occurred in any of the cylinders which are currently in operation. Note that the abnormality detection method itself in this step 100 may be of any kind provided it can detect that any abnormality has occurred in any of the cylinders which are currently in operation, without being limited to the method which utilizes rotational variation of the crankshaft and deviation of the air fuel ratio as described above.

When the determination of above-described step 100 is positive, that is, when it is recognized that abnormality has occurred in any of the four cylinders which are currently in operation, No. 1 and No. 4 cylinders are halted (step 102). To be more specific, the fuel injection valve 26 is controlled such that fuel supply to No. 1 and No. 4 cylinders is halted; and the variable valve operating mechanisms 18 and 20 are controlled so that the operations of the intake and exhaust valves of these cylinders are halted in the closed state.

Next, with No. 1 and No. 4 cylinders being halted, an abnormality detection processing similar to that of above-described step 100 is executed (step 104). When, as a result of that, the determination of this step 104 is negative, that is, when the abnormality becomes not to be detected in association with the halting of No. 1 and No. 4 cylinders, it can be judged that not No. 2 and No. 3 cylinders which are currently in operation, but either of No. 1 and No. 4 cylinders which are currently halted, is abnormal. For this reason, in this case, only No. 1 cylinder is halted (step 106) in order to identify which of No. 1 and No. 4 cylinders is abnormal.

Next, with only No. 1 cylinder being halted, an abnormality detection processing similar to that of above-described step 100 is executed (step 108). When, as a result of that, the determination of this step 108 becomes negative, that is, when the abnormality becomes undetected in association with the halting of No. 1 cylinder, it is determined that No. 1 cylinder which has been halted this time is abnormal (step 110). On the other hand, when the determination of this step 108 is positive, that is, when the abnormality is still detected with No. 1 cylinder being halted, it is determined that No. 4 cylinder which is currently in operation is abnormal (step 112).

On the other hand, when the determination of above-described step 104 is positive, that is, when the abnormality is still detected with No. 1 and No. 4 cylinders being halted, it can be judged that either of No. 2 and No. 3 cylinders which are currently in operation is abnormal. For this reason, in this case, only No. 2 cylinder is halted (step 114) in order to identify which of No. 2 and No. 3 cylinders is abnormal.

Next, with only No. 2 cylinder being halted, an abnormality detection processing similar to that of above-described step 100 is executed (step 116). When, as a result of that, the determination of this step 116 becomes negative, that is, when the abnormality becomes undetected in association with the halting of No. 2 cylinder, it is determined that No. 2 cylinder which is halted this time is abnormal (step 118). On the other hand, when the determination of this step 116 is positive, that is, when the abnormality is still detected with No. 2 cylinder being halted, it is determined that No. 3 cylinder which is currently in operated is abnormal (step 120).

According to the processing of the routine shown in FIG. 13 described so far, after it is determined in which of the cylinder group made up of No. 1 and No. 4 cylinders and the cylinder group made up of No. 2 and No. 3 cylinders an abnormal cylinder is included, one cylinder of the cylinder group where it is judged that an abnormal cylinder is included is halted to identify an abnormal cylinder. According to such abnormal cylinder identification method, it is possible to effectively decrease the number of executions of the cylinder halting and also effectively reduce the cylinder halting time. As a result, it becomes possible to accurately identify the abnormal cylinder while suppressing adverse effects on the driving performance of the vehicle and the noise and vibration of the internal combustion engine. Moreover, since the halting of valve operations as well as the halting of fuel supply is executed at the time of the cylinder halting, it becomes possible to prevent the air from being discharged from the halted cylinder and thus to identify the abnormal cylinder while preventing the deterioration of the catalyst 14.

Moreover, in the processing of the above described routine, an arrangement is made such that at the time of the identification of the abnormal cylinder, a cylinder group in which halting intervals (explosion intervals) are uniform is selected to execute a first cylinder halting, and thereafter, the number of the cylinders to be halted is changed from two cylinders to one cylinder. According to such a method, it becomes possible to identify the abnormal cylinder while minimizing the deterioration of the noise and vibration characteristics associated with cylinder halting. To be more specific, it becomes possible to accurately identify the abnormal cylinder only by: a one-time halting of the above-described cylinder group which is selected to minimize the degradation of the noise and vibration characteristics; and only a one-time halting of only one cylinder in one of the cylinder groups. That is, it becomes possible to accurately identify the abnormal cylinder while minimizing the number of execution of and the operating time of a single-cylinder halting operation which may deteriorate the noise and vibration characteristics.

Moreover, it is difficult in reality to accurately determine from which cylinder the rotational variation of the crankshaft and the deviation of the A/F, which are caused by an abnormality, originate, based on the rotational variation of the crankshaft and the deviation of the A/F detected at the integral part of the exhaust manifold. However, according to the abnormal cylinder identification method of the present embodiment, for the sake of the detection itself of the rotational variation of the crankshaft and the deviation of the A/F, etc., only a level of accuracy which enables the determination of if any abnormality has occurred in any of the cylinders of the internal combustion engine 10 is needed and a level of accuracy which enables the identification of the abnormal cylinder is not needed so that it becomes possible to accurately identify the abnormal cylinder by appropriately performing the changing of the cylinder to be halted as described above.

Moreover, the above described cylinder halting which is executed to identify the abnormal cylinder in the present embodiment is preferably executed while the load of the internal combustion engine 10 is low. This makes it possible to sufficiently reduce adverse effects on the driving performance of the vehicle and the noise and vibration characteristics of the internal combustion engine 10.

Meanwhile, in the first embodiment, which has been described above, although the arrangement is made such that when an abnormality occurrence is recognized at the time of the all-cylinder (4-cylinder) operation, No. 1 and No. 4 cylinders are halted; the cylinder groups to be halted at this time may be No. 2 and No. 3 cylinders. Moreover, although the arrangement is made such that at the time of the halting of No. 1 and No. 4 cylinders, only No. 2 cylinder (step 114) or only No. 1 cylinder (step 106) is halted depending on the presence or absence of the abnormality occurrence; in stead of this, the arrangement may be such that only No. 3 cylinder is halted in step 114 and only No. 4 cylinder is halted in step 106.

Moreover, in the first embodiment, which has been described above, the arrangement is made such that when identifying an abnormal cylinder in the internal combustion engine 10 in which explosion strokes takes place at uniform intervals in the order of No. 1 to No. 3, to No. 4, and to No. 2; a cylinder group in which halting intervals (explosion intervals) are uniform is selected to perform a first cylinder halting. However, in an internal combustion engine having multiple cylinders, there may be cases in which explosion intervals of each cylinder are not, intentionally or consequently, necessarily uniform. Even in such an internal combustion engine in which explosion strokes take place at such non-uniform intervals, when performing the identification of abnormal cylinders according to the present invention, in order to suppress the deterioration of noise and vibration characteristics, it is preferable to select a cylinder group in which halting intervals (or explosion intervals) are closest to uniform (are substantially uniform) considering the explosion order and perform cylinder halting.

Moreover, in the first embodiment, which has been described above, description is made on an example in which when cylinder halting is performed, the operations of both the intake valve and the exhaust valve are halted in the closed state. However, the valve to be halted in the closed state at the time of cylinder halting in the present invention may be either one of the intake valve and the exhaust valve.

Note that in the first embodiment, which has been described above, the "abnormality detection means" in the above-described first aspect of the present invention, the "first cylinder-halting execution means" in the above-described first, third, or fifth aspect of the present invention, the "second cylinder-halting execution means" in the above-described first, third, or fifth aspect of the present invention, and the "abnormal cylinder identification means" in the above-described first aspect of the present invention are implemented by the ECU 22 executing the processing of above-described step 100, 104, 108, or 116, the processing of above-described step 102, the processing of above-described step 106 or 114, and the processing of above-described steps 108 to 112, or steps 116 to 120, respectively.

Moreover, in the first embodiment, which has been described above, the "halted-cylinder-number reduction execution means" in the above-described second aspect of the present invention is implemented by the ECU 22 executing the processing of above-described steps 102 to 106 (or 102, 104, and 114).

Furthermore, in the first embodiment, which has been described above, the "abnormal cylinder-group determination means" in the above-described third or fifth aspect of the present invention and the "in-cylinder-group abnormality identification means" in the above-described third or fifth aspect of the present invention are implemented by the ECU 22 executing the processing of above-described step 104 and the processing of above-described steps 108 to 112, or steps 116 to 120, respectively.

Second Embodiment

Next, a second embodiment of the present invention will be described with reference to FIG. 14.

The system of the present embodiment can be implemented by using the hardware configuration shown in FIGS. 1 to 12 and causing the ECU 22 to execute the routine shown in FIG. 14 described below, in stead of the routine shown in FIG. 13.

[Abnormal Cylinder Identification Method of the Second Embodiment]

In the first embodiment described above, description has been made on the abnormal cylinder identification method which assumes the case where abnormality occurs only in any one cylinder in the 4-cylinder internal combustion engine 10. In contrast to this, in the present embodiment, description will be made on an abnormal cylinder identification method which assumes a case in which abnormality occurs in a plurality of cylinders of the internal combustion engine 10.

Figure 14:
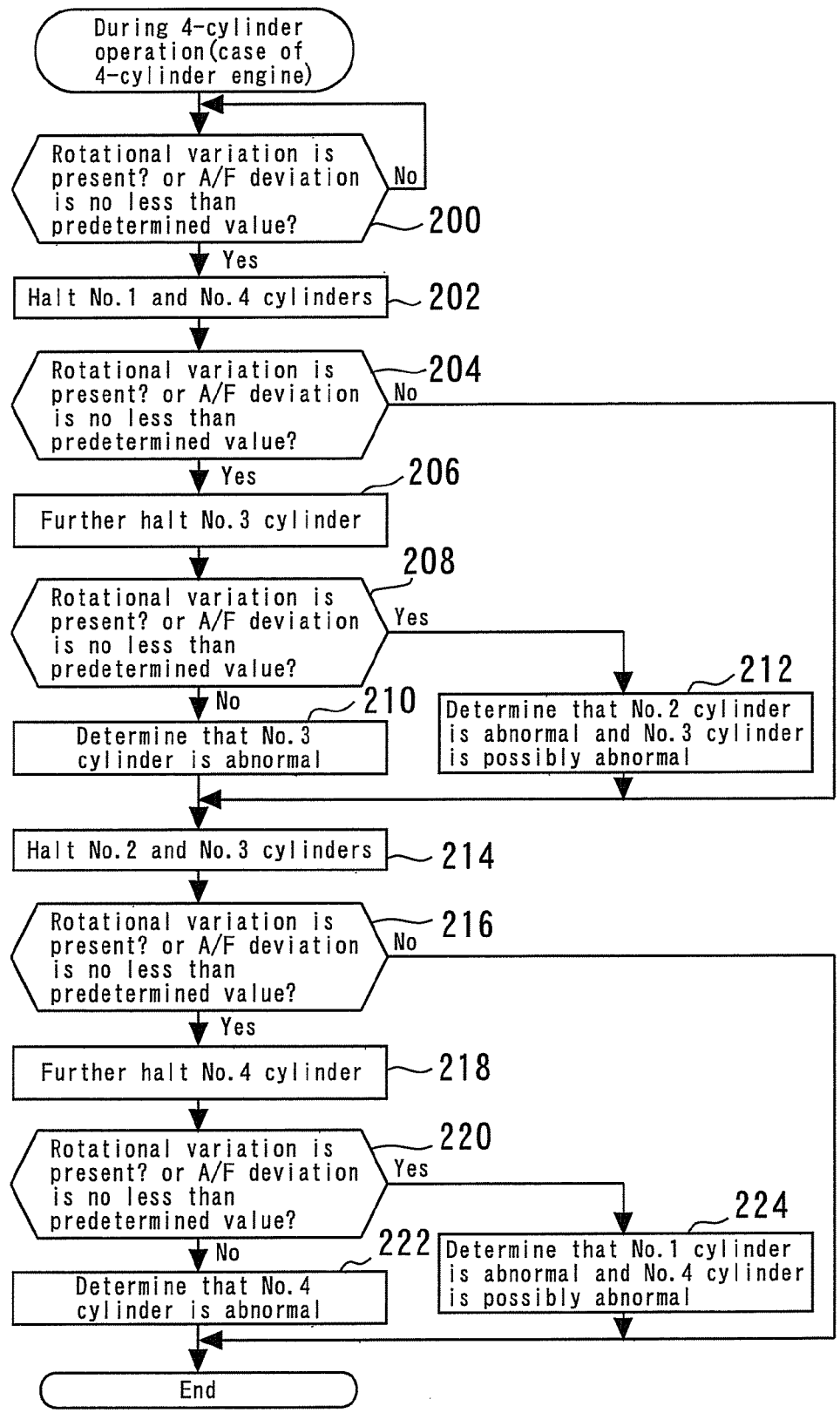
FIG. 14 is a flowchart illustrating a routine that is executed according to a second embodiment of the present invention.

FIG. 14 is a flowchart of the routine to be executed by the ECU 22 to implement an abnormal cylinder identification method according to the second embodiment of the present invention.

In the routine shown in FIG. 14, first, an abnormality detection processing which is similar to above-described step 100 is executed during an all-cylinder operation (step 200). When, as a result of that, the determination of this step 200 is positive, that is, when it is recognized that abnormality has occurred in any of the four cylinders which are currently in operation, No. 1 and No. 4 cylinders are halted (step 202).

Next, with No. 1 and No. 4 cylinders being halted, an abnormality detection processing similar to that of above-described step 100 is executed (step 204). When, as a result of that, the determination of this step 204 is positive, that is, an abnormality is still detected even with No. 1 and No. 4 cylinders being halted, it can be judged that at least one of No. 2 and No. 3 cylinders which are currently in operation is abnormal, and also that No. 1 and No. 4 cylinders which are currently halted are possibly abnormal. Because of this, in this case, No. 3 cylinder is further halted in addition to No. 1 and No. 4 cylinders (step 206) in order to further advance the identification of the abnormal cylinder(s). Note that in this step 206, No. 2 cylinder, in place of No. 3 cylinder, may be halted.

Next, with No. 1, No. 3 and No. 4 cylinders being halted (that is, with only No. 2 cylinder being operated), an abnormality detection processing similar to that of above-described step 100 is executed (step 208). When, as a result of that, the determination of this step 208 becomes negative, that is, when abnormality becomes undetected in association with the halting of No. 1, No. 3, and No. 4 cylinders, it is determined that No. 3 cylinder, which is additionally halted this time, is abnormal (step 210). On the other hand, when the determination of this step 208 is positive, that is, when abnormality is still detected with No. 1, No. 3, and No. 4 cylinders being halted, it is determined that No. 2 cylinder which is currently in operation is abnormal and No. 3 cylinder which is additionally halted this time is possibly abnormal (step 212).

Moreover, in the routine shown in FIG. 14, when the identification of the abnormal cylinder(s) relating to No. 2 and No. 3 cylinders is performed by the processing of above described steps 206 to 212; or when as a result of the determination of above-described step 204 becoming negative (because abnormality is not detected with No. 1 and No. 4 cylinders being halted), it can be judged that not No. 2 and No. 3 cylinders which are currently in operation, but only at least one of No. 1 and No. 4 cylinders which are currently halted, is abnormal; then No. 2 and No. 3 cylinders are halted (step 214).

Next, with No. 2 and No. 3 cylinders being halted, an abnormality detection processing similar to that of above-described step 100 is executed (step 216). When, as a result of that, the determination of this step 216 becomes negative, it can be judged that in a situation in which an occurrence of abnormality is recognized during the halting of No. 1 and No. 4 cylinders (a situation in which the determination of above-described step 204 is positive), there is no abnormality in No. 1 and No. 4 cylinders and only at least one of No. 2 and No. 3 cylinders is abnormal. In this case, since the identification of the abnormal cylinder(s) relating to No. 2 and No. 3 cylinders has already been performed by the processing of above-described steps 206 to 212, the identification of the abnormal cylinder(s) relating to No. 2 and No. 3 cylinders is not be performed.

On the other hand, when the determination of above-described step 216 is positive, that is, when an abnormality is still detected with No. 2 and No. 3 cylinders being halted, it can be judged that at least one of No. 1 and No. 4 cylinders which are currently in operation is abnormal. As a result, in this case, in order to further perform the identification of the abnormal cylinder(s), No. 4 cylinder in addition to No. 2 and No. 3 cylinders is further halted (step 218). Note that in this step 218, No. 1 cylinder in place of No. 4 cylinder may be halted.

Next, with No. 2, No. 3, and No. 4 cylinders being halted (that is, with only No. 1 cylinder being operated), an abnormality detection processing similar to that of above-described step 100 is executed (step 220). When, as a result of that, the determination of this step 220 becomes negative, that is, when abnormality becomes undetected in association with the halting of No. 2, No. 3, and No. 4 cylinders, it is determined that No. 4 cylinder which is additionally halted this time is abnormal (step 222). On the other hand, when the determination of this step 220 is positive, that is, when abnormality is still detected with No. 2, No. 3, and No. 4 cylinders being halted, it is judged that No. 1 cylinder which is currently in operation is abnormal and also that No. 4 cylinder which is additionally halted this time is possibly abnormal (step 224).

According to the processing of the routine shown in FIG. 14 described above, even when it is assumed that abnormality occurs in a plurality of cylinders of the internal combustion engine 10, it becomes possible to identify the abnormal cylinder(s) at an enough level for practical use while suppressing the deterioration of the catalyst 14.

Moreover, since in the above-described routine, the arrangement is made such that first, one of the cylinder groups (No. 1 and No. 4, or No. 2 and No. 3) is selected to perform cylinder halting and thereafter the presence or absence of abnormal phenomena is determined, it becomes possible to extract a case in which it can be judged that abnormality is present only in one of the cylinder groups, compared with a method by which an abnormal cylinder is identified by successively executing a single-cylinder operation for all the cylinders. As a result of this, there may be an opportunity to avoid unnecessary single-cylinder operations being performed for the identification of the abnormal cylinder(s). To be specific, in a case in which the determination of above-described step 204 becomes negative (that is, a case in which it is judged that abnormality is present in only at least one of No. 1 and No. 4 cylinders), it is possible to avoid the execution of an unnecessary single-cylinder operation for the purpose of the identification of the abnormal cylinder(s) relating to No. 2 and No. 3 cylinders. Further, since in the present embodiment as well, cylinders to be halted are divided into groups by selecting cylinders between which halting intervals (explosion intervals) are uniform, it is possible to well prevent the deterioration of noise and vibration characteristics of the internal combustion engine 10 at the time of the identification of the abnormal cylinder(s).

Note that in the second embodiment, which has been described above, the "first cylinder-halting execution means" in the above-described first, third, or sixth aspect of the present invention, the "second cylinder-halting execution means" in the above-described first, third, or sixth aspect of the present invention, the "abnormal cylinder-group determination means" in the above-described third or sixth aspect of the present invention, and the "in-cylinder-group abnormality identification means" in the above-described third or sixth aspect of the present invention are implemented by the ECU 22 executing the processing of above-described step 202 or 214, the processing of above-described step 206 or 218, the processing of above-described steps 204 and 216, and the processing of above-described steps 208 to 212, or steps 220 to 224, respectively.

Third Embodiment

Next, a third embodiment of the present invention will be described with reference to FIGS. 15 and 16.

Figure 15:
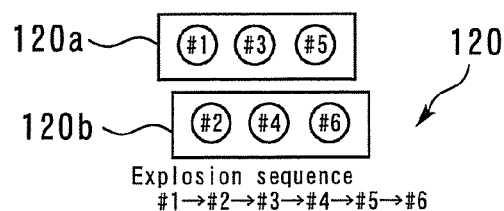
FIG. 15 is a diagram showing the arrangement and explosion sequence of each cylinder of an internal combustion engine 120 according to a third embodiment of the present invention.

FIG. 15 is a diagram showing the arrangement and explosion sequence of each cylinder of an internal combustion engine 120 in the third embodiment of the present invention. As shown in FIG. 15, the internal combustion engine 120 of the present embodiment is supposed to be a 6-cylinder engine and, to be more specific, a V-type 6-cylinder engine having a total of six cylinders (No. 1 to No. 6) in two banks 120a and 120b. Moreover, herein, three cylinders disposed in one bank 120a are referred to as No. 1, No. 3, and No. 5 cylinders, and the three cylinders disposed in the other bank 120b are referred to as No. 2, No. 4, and No. 6 cylinders. Moreover, it is supposed that the explosion sequence of the internal combustion engine 120 is, as an example, No. 1 to No. 2, to No. 3, to No. 4, to No. 5, and to No. 6. and the explosion stroke of each cylinder takes place in this sequence at uniform intervals.

The internal combustion engine 120 of the present embodiment is configured basically in the same manner as the internal combustion engine 10 except that engine types are different from each other. That is, although not shown, it is supposed that a fuel injection valve is provided in each cylinder and a variable valve operating mechanism which can halt the intake and exhaust valves in the closed state is provided for each cylinder. Moreover, an appropriate number of catalysts are disposed in an exhaust passage. Further, it is supposed that in a portion at the downstream of the integral part of the exhaust manifold of each bank 120a, 120b, and in a portion after the confluence of exhaust gases discharged from both the banks 120a and 120b; an A/F sensor (or O2 sensor) is disposed for detecting an air fuel ratio at those points.

[Abnormal Cylinder Identification Method of the Third Embodiment]

Figure 16:
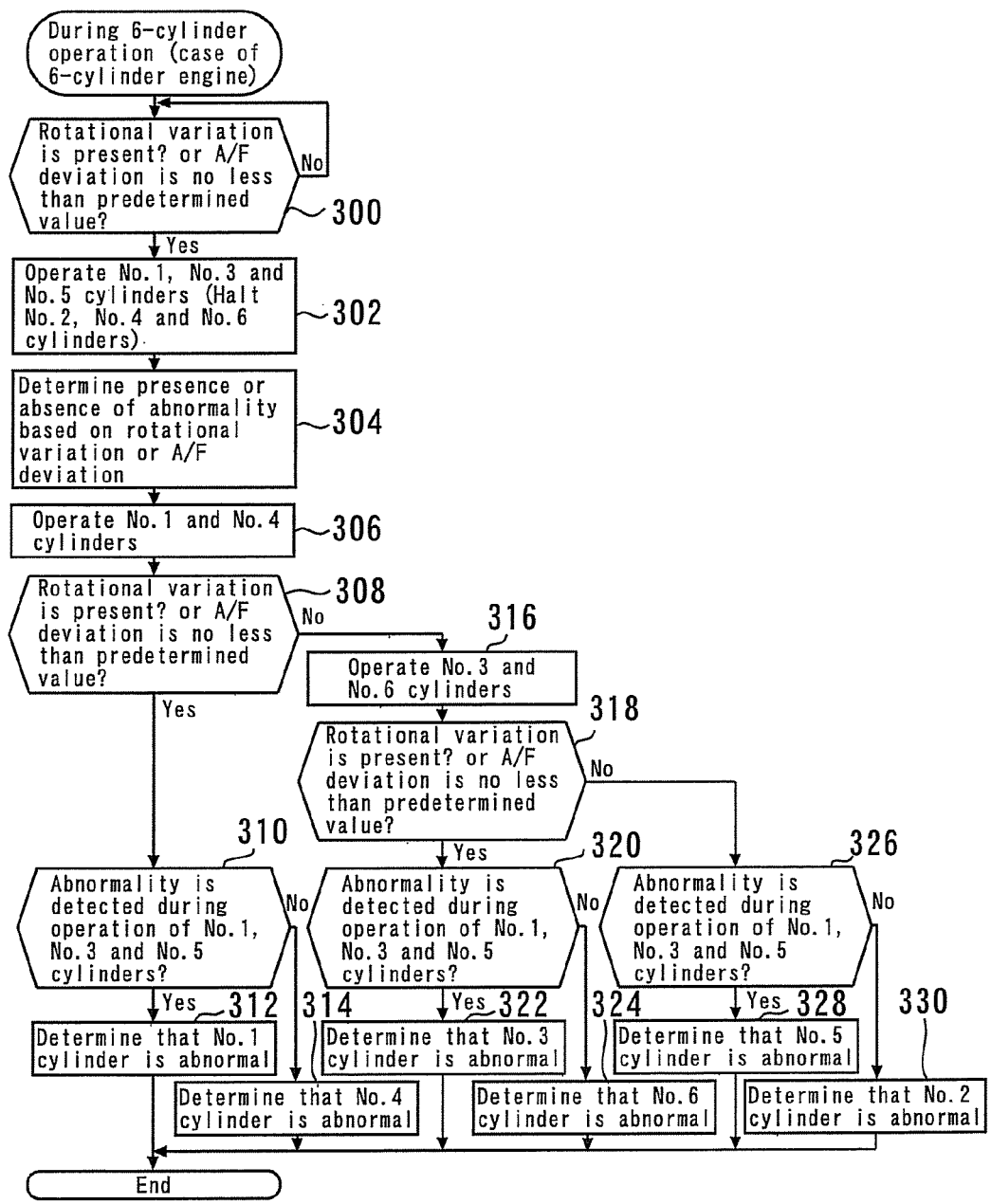
FIG. 16 is a flowchart illustrating a routine that is executed according to the third embodiment of the present invention.

FIG. 16 is a flowchart of the routine to be executed by the ECU 22 to implement an abnormal cylinder identification method according to the third embodiment of the present invention. Note that it is supposed that the present routine is executed when the internal combustion engine 120 which is a 6-cylinder engine is in a 6-cylinder (all-cylinder) operation. Further, in the present embodiment, description will be made on the processing in which it is assumed that abnormality occurs only in any one of the six cylinders included in the internal combustion engine 120.

In the routine shown in FIG. 16, first, during an all-cylinder operation, an abnormality detection processing which is similar to that of above-described step 100 is executed (step 300).

When, as a result of that, the determination of this step 300 is positive, that is, when it is recognized that abnormality has occurred in any of the six cylinders which are currently in operation; a reduced-cylinder operation by use of No. 1, No. 3, and No. 5 cylinders is executed (step 302). That is, No. 2, No. 4, and No. 6 cylinders are halted.

Next, with No. 1, No. 3, and No. 5 cylinders being operated, the presence or absence of abnormality is determined by a method similar to that of above-described step 100 (step 304). Next, a reduced-cylinder operation by use of No. 1 and No. 4 cylinders is executed (step 306). Next, with the reduced-cylinder operation by use of No. 1 and No. 4 cylinders being performed, an abnormality detection processing similar to that of above-described step 100 is executed (step 308).

When the determination of above-described step 308 is positive, that is, when abnormality is detected during the reduced-cylinder operation by use of No. 1 and No. 4 cylinders, it can be judged that either of No. 1 and No. 4 cylinders which are currently in operation is abnormal. In this case, then, it is determined whether or not an abnormality has been recognized at the time of the abnormality determination under the reduce-cylinder operation by use of No. 1, No. 3, and No. 5 cylinders in above-described step 304 (step 310). When, as a result, the determination of this step 310 is positive, since this corresponds to a case in which it can be judged that either of No. 1 and No. 4 cylinders is abnormal, and any of No. 1, NO. 3, and No. 5 cylinders is abnormal; it is determined that No. 1 cylinder is abnormal (step 312). On the other hand, when the determination of this step 310 becomes negative, since this corresponds to a case in which it can be judged that either of No. 1 and No. 4 cylinders is abnormal, and any of No. 2, No. 4, and No. 6 cylinders is abnormal; it is determined that No. 4 cylinder is abnormal (step 314).

Moreover, when the determination of above-described step 308 becomes negative, that is, when abnormality becomes undetected during the reduced-cylinder operation by use of No. 1 and No. 4 cylinders, a reduced-cylinder operation by use of No. 3 and No. 6 cylinders is executed (step 316). Then, with the reduced-cylinder operation by use of No. 3 and No. 6 cylinders being performed, an abnormality detection processing similar to that of above-described step 100 is executed (step 318).

When the determination of above described step 318 is positive, that is, when abnormality is detected during the reduced-cylinder operation by use of No. 3 and No. 6 cylinders, it can be judged that either of No. 3 and No. 6 cylinders which are currently in operation is abnormal. In this case, then, it is determined whether or not an abnormality has been recognized at the time of the abnormality determination under the reduced-cylinder operation by use of No. 1, No. 3, and No. 5 cylinders in above-described step 304 (step 320). When, as a result, the determination of this step 320 is positive, since this corresponds to a case in which it can be judged that either of No. 3 and No. 6 cylinders is abnormal, and that any of No. 1, No. 3, and No. 5 cylinders is abnormal; it is determined that No. 3 cylinder is abnormal (step 322). On the other hand, when the determination of this step 320 becomes negative, since this corresponds to a case in which it can be judged that either of No. 3 and No. 6 cylinders is abnormal, and that any of No. 2, No. 4, and No. 6 cylinders is abnormal; it is determined that No. 6 cylinder is abnormal (step 324).

Moreover, when the determination of the above step 318 becomes negative, that is, when no abnormality is detected during the reduced-cylinder operation by use of No. 3 and No. 6 cylinders, it can be judged that either of the remaining No. 2 and No. 5 cylinders is abnormal. In this case, then, it is determined whether or not an abnormality has been recognized at the time of abnormality determination under the reduced-cylinder operation by use of No. 1, No. 3, and No. 5 cylinders in above-described step 304 (step 326). When, as a result, the determination of this step 326 is positive, since this corresponds to a case in which it can be judged that either of No. 2 and No. 5 cylinders is abnormal, and that any of No. 1, No. 3, and No. 5 cylinders is abnormal; it is determined that No. 5 cylinder is abnormal (step 328). On the other hand, when the determination of this step 326 becomes negative, since this corresponds to a case in which it can be judged that either of No. 2 and No. 5 cylinders is abnormal, and that any of No. 2, No. 4, and No. 6 cylinders is abnormal; it is determined that No. 2 cylinder is abnormal (step 330).

According to the processing of the routine shown in FIG. 16 described so far, in a case where it is assumed that abnormality occurs only in any one of the cylinders of the internal combustion engine 120 which is a 6-cylinder engine, it becomes possible to accurately identify the abnormal cylinder while suppressing the deterioration of the catalyst which is disposed in the exhaust passage.

Moreover, in the processing of the above described routine, when abnormality is recognized in any cylinder, first, it is determined whether or not abnormality is recognized in one of two cylinder groups made up of a half number of cylinders (3 cylinders) (for example, No. 1, No. 3, and No. 5), and thereafter it is successively determined whether or not abnormality is recognized in another sort of cylinder groups, which are made up by collecting one cylinder from each of the cylinder groups. According to this method, the number of times at which a part of the cylinders are halted for the identification of the abnormal cylinder is reduced to two or three. Thus, according to the processing of the above-described routine, it becomes possible to sufficiently reduce the number of times and the time period at and during which a part of the cylinders are halted for the identification of the abnormal cylinder and to accurately identify the abnormal cylinder. Adding further thereto, it becomes possible to identify the abnormal cylinder while obviating the need of a single-cylinder operation which raises a concern that the noise and vibration characteristics deteriorate.

Moreover, in the processing of the above-described routine as well, consideration is given that cylinder halting is performed by selecting a cylinder group, in which explosion intervals are uniform, as the operating cylinder in order to reduce the noise and vibration levels during the operation in which a partial cylinder is halted. Specifically, for either of a cylinder group (No. 1, No. 3, and No. 5) which is selected first, and another sort of cylinder groups (No. 1 and No. 4, and No. 3 and No. 6) which are selected thereafter; three cylinders or two cylinders between which explosion intervals are uniform are selected. As a result of this, it becomes possible to identify the abnormal cylinder while sufficiently suppressing the noise and vibration levels in the internal combustion engine 120 which is a 6-cylinder engine.

Meanwhile, in the third embodiment described above, although the arrangement is made such that when an occurrence of abnormality is recognized during an all-cylinder (six-cylinder) operation, No. 1, No. 3, and No. 5 cylinders are operated as three cylinders between which explosion intervals are uniform; the cylinder group to be used for the 3-cylinder operation may be made up of No. 2, No. 4, and No. 6 cylinders. Moreover, although the arrangement is made such that No. 1 and No. 4 cylinders and then No. 3 and No. 6 cylinders are thereafter operated as the two cylinders between which explosion intervals are uniform; the cylinder group to be used for these two-cylinder operations may be any two of a cylinder group made up of No. 1 and No. 4 cylinders, a cylinder group made up of No. 3 and No. 6 cylinders, and a cylinder group made up of No. 2 and No. 5 cylinders.

Note that in the third embodiment, which has been described above, the "first cylinder-halting execution means" in the above-described first or seventh aspect of the present invention, the "second cylinder-halting execution means" in the above-described first or seventh aspect of the present invention, the "abnormal cylinder-group determination means" in the above-described seventh aspect of the present invention, and the "in-cylinder-group abnormality identification means" in the above-described seventh aspect of the present invention are implemented by the ECU 22 executing the processing of above-described step 302, the processing of above-described step 306 or 316, the processing of above-described step 304, 310, 320, or 326, and the processing of above-described step 308 or 318, respectively.

Fourth Embodiment

Next, a fourth embodiment of the present invention will be described with reference to FIGS. 17 to 19.

The system of the present embodiment can be implemented by using the hardware configuration shown in FIGS. 2 to 12, and 15, and causing the ECU 22 to execute the routine shown in FIGS. 17 to 19 described below, in place of the routine shown in FIG. 16.

[Abnormal Cylinder Identification Method of the Fourth Embodiment]

In the third embodiment described above, the abnormal cylinder identification method which assumes the case in which abnormality occurs only in any one of the cylinders in a 6-cylinder internal combustion engine 120 has been described. In contrast to this, in the present embodiment, description will be made on an abnormal cylinder identification method which assumes a case in which abnormality occurs in a plurality of cylinders of the internal combustion engine 120.

Figure 17:
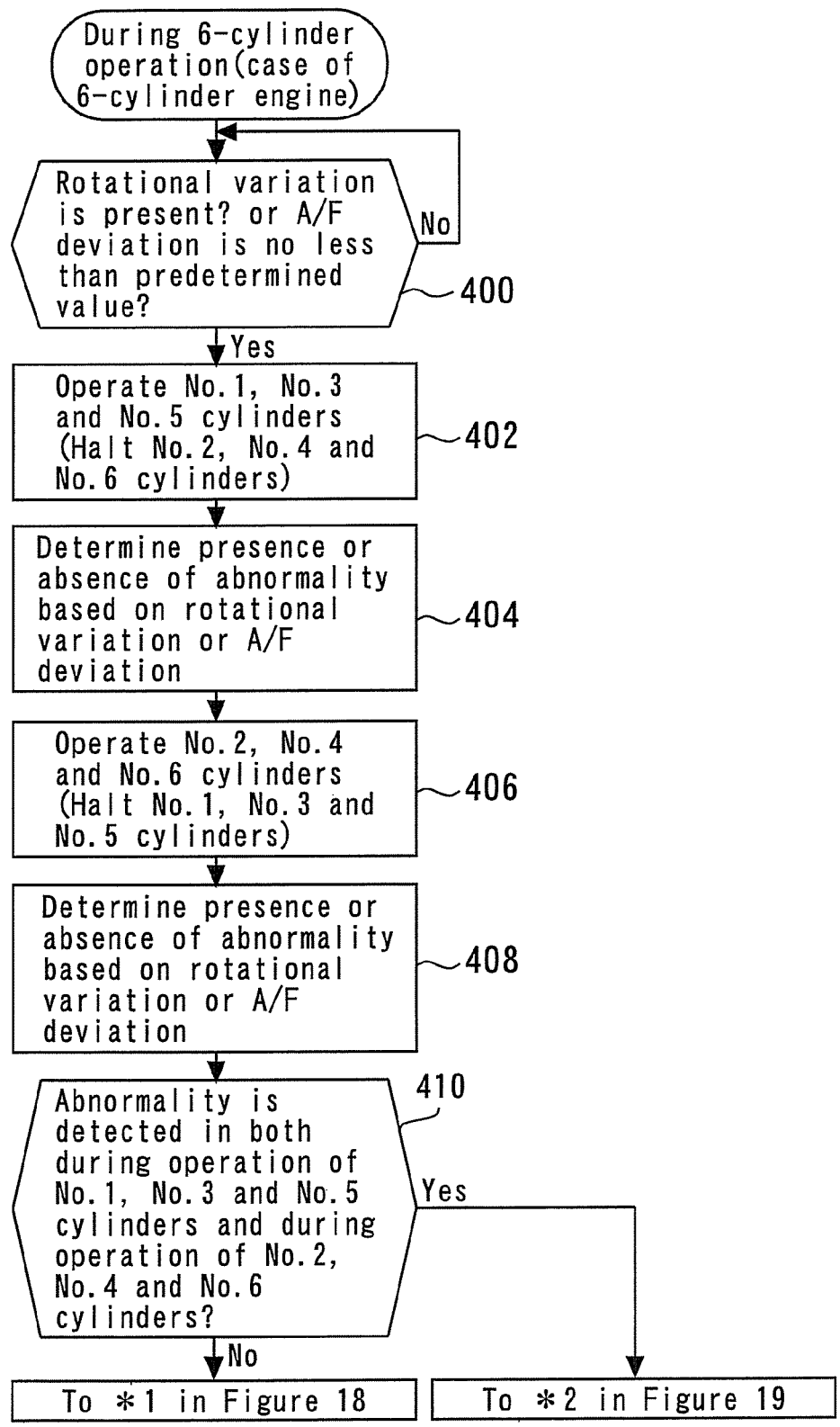
FIG. 17 is a flowchart illustrating a routine that is executed according to a fourth embodiment of the present invention.
Figure 18:
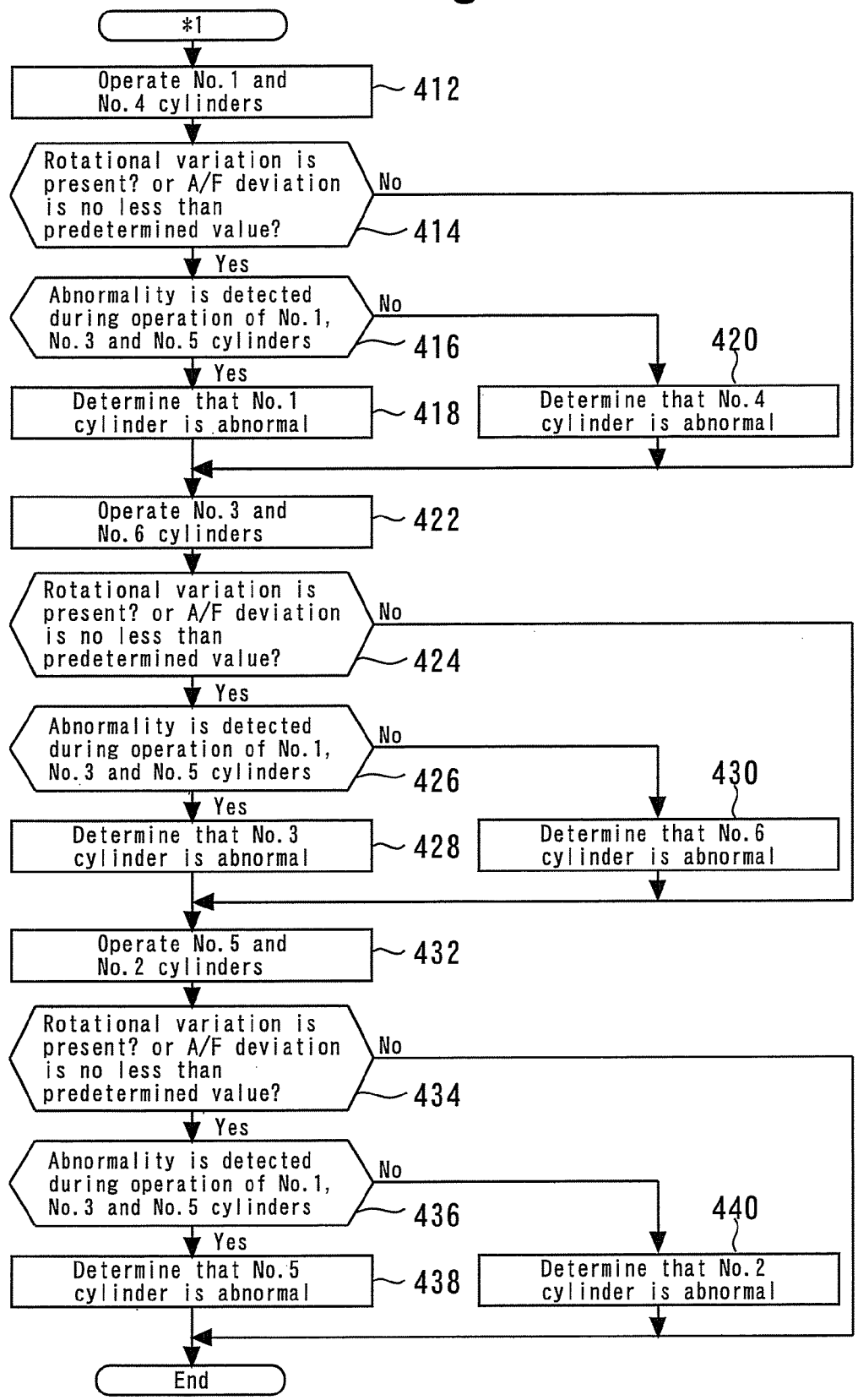
FIG. 18 is a flowchart illustrating a routine that is executed according to the fourth embodiment of the present invention.
Figure 19:
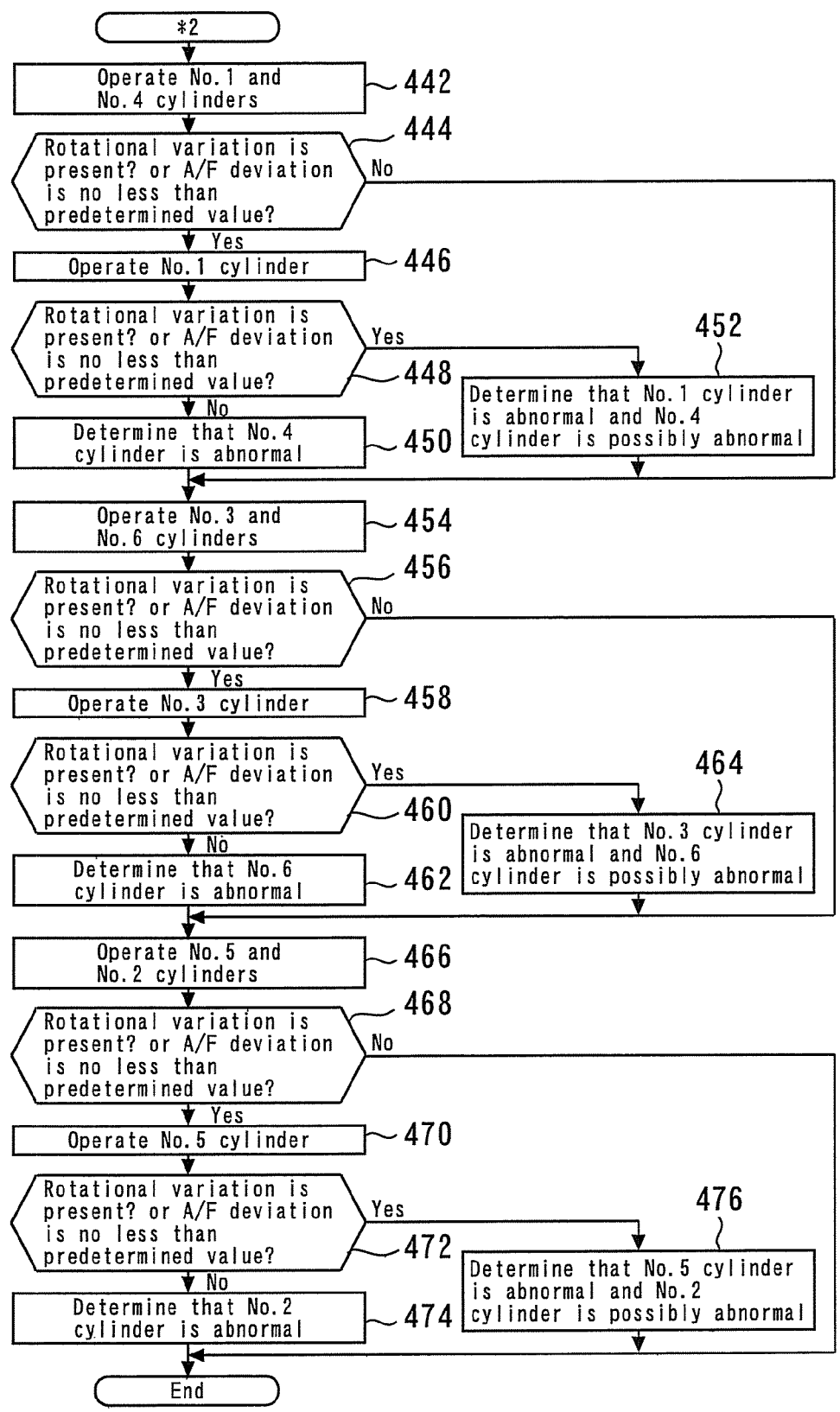
FIG. 19 is a flowchart illustrating a routine that is executed according to the fourth embodiment of the present invention.

FIGS. 17 to 19 are a flowchart of the routine to be executed by the ECU 22 to implement an abnormal cylinder identification method according to the fourth embodiment of the present invention. Note that FIGS. 17 to 19 show in combination a series of complete processing, that is, the routine of the abnormal cylinder identification method of the present embodiment.

In the present routine, first, as shown in FIG. 17, an abnormality detection processing similar to that of above-described step 100 is executed during an all-cylinder operation (step 400). When, as a result of that, the determination of this step 400 is positive, that is, when it is recognized that abnormality has occurred in any of six cylinders which are currently in operation; a reduced-cylinder operation by use of No. 1, No. 3, and No. 5 cylinders is executed (step 402). That is, No. 2, No. 4, and No. 6 cylinders are halted.

Next, with No. 1, No. 3, and No. 5 cylinders being operated, an abnormality detection processing similar to that of above-described step 100 is executed (step 404). Then, a reduced-cylinder operation by use of No. 2, No. 4, and No. 6 cylinders is executed (step 406). That is, No. 1, No. 3, and No. 5 cylinders are halted. Thereafter, with No. 2, No. 4, and No. 6 cylinders being operated, an abnormality detection processing similar to that of above-described step 100 is executed (step 408).

Next, based on the result of the abnormality detection processing of above-described steps 404 and 408, it is determined whether or not abnormality is detected in both during the operation of No. 1, No. 3, and No. 5 cylinders and during the operation of No. 2, No. 4, and No. 6 cylinders (step 410). When, as a result of that, the determination of this step 410 is negative, that is, when abnormality is detected only in either one of during the operation of No. 1, No. 3, and No. 5 cylinders and during the operation of No. 2, No. 4, and No. 6 cylinders; then a series of processing shown after "*1" in FIG. 18 is executed.

That is, as shown in FIG. 18, first, a reduced-cylinder operation by use of No. 1 and No. 4 cylinders is executed (step 412). Then, with the reduced-cylinder operation by use of No. 1 and No. 4 cylinders being performed, an abnormality detection processing similar to that of above-described step 100 is executed (step 414). When, as a result of that, the determination of this step 414 is positive, that is, when it can be judged that either one of No. 1 and No. 4 cylinders is abnormal; it is determined whether or not abnormality has been recognized at the time of the abnormality determination under the reduced-cylinder operation by use of No. 1, No. 3, and No. 5 cylinders in above-described step 402 (step 416). When, as a result of that, the determination of this step 416 is positive, since this corresponds to a case in which it can be judged that either of No. 1 and No. 4 cylinders is abnormal, and that any of No. 1, No. 3, and No. 5 cylinders is abnormal; it is determined that No. 1 cylinder is abnormal (step 418). On the other hand, when the determination of this step 416 becomes negative, this corresponds to a case in which it is judged that either of No. 1 and No. 4 cylinders is abnormal, and that any of No. 2, No. 4, and No. 6 cylinders is abnormal; it is determined that No. 4 cylinder is abnormal (step 420).

Moreover, when the determination of the above step 414 becomes negative (that is, when abnormality has not been detected during the reduced-cylinder operation by use of No. 1 and No. 4 cylinders), or when abnormality identification (above-described steps 416 to 420) relating to No. 1 and No. 4 cylinders is completed, then, a reduced-cylinder operation by use of No. 3 and No. 6 cylinders is executed (step 422). In addition, with the reduced-cylinder operation by use of No. 3 and No. 6 cylinders being performed, an abnormality detection processing similar to that of above-described step 100 is executed (step 424). When, as a result of that, the determination of this step 424 is positive (that is, when it can be judged that either of No. 3 and No. 6 cylinders is abnormal), it is identified which of No. 3 and No. 6 cylinders is an abnormality-occurring cylinder through the processing of steps 426 to 430 similar to the case of above-described No. 1 and No. 4 cylinders.

Further, when the determination of the above step 424 becomes negative (that is, when no abnormality is detected during the reduced-cylinder operation by use of No. 3 and No. 6 cylinders), or when abnormality identification relating to No. 3 and No. 6 cylinders (above-described steps 426 to 430) is completed; then, a reduced-cylinder operation by use of No. 5 and No. 2 cylinders is executed (step 432). In addition, with the reduced-cylinder operation by use of No. 5 and No. 2 cylinders being performed, an abnormality detection processing similar to that of above-described step 100 is executed (step 434). When, as a result of that, the determination of this step 434 is positive (that is, when it can be judged that either of No. 5 and No. 2 cylinders is abnormal); hereafter, it is identified which of No. 5 and No. 2 cylinders is an abnormality-occurring cylinder through the processing of steps 436 to 440 similar to, for example, the case of above-described No. 1 and No. 4 cylinders.

On the other hand, when the determination of above-described step 410 (see FIG. 17) is positive (that is, when abnormality is detected in both during the operation of No. 1, No. 3, and No. 5 cylinders and during the operation of No. 2, No. 4, and No. 6 cylinders); then, a series of processing after "*2" shown in FIG. 19 are executed.

That is, as shown in FIG. 19, first, a reduced-cylinder operation by use of No. 1 and No. 4 cylinders is executed (step 442). Then, with the reduced-cylinder operation by use of No. 1 and No. 4 cylinders being performed, an abnormality detection processing similar to that of above-described step 100 is executed (step 444). When, as a result of that, the determination of this step 444 is positive, that is, when it can be judged that at least one of No. 1 and No. 4 cylinders is abnormal; operation is performed with only No. 1 cylinder to further advance the identification of the abnormal cylinder(s) (step 446). Note that in this step 446, operation may be performed only with No. 4 cylinder, in place of No. 1 cylinder.

Next, with only No. 1 cylinder being operated, an abnormality detection processing similar to that of above-described step 100 is executed (step 448). When, as a result of that, the determination of this step 448 becomes negative, that is, when abnormality becomes undetected in association with the halting of No. 4 cylinder; it is determined that No. 4 cylinder which is additionally halted this time is abnormal (step 450). On the other hand, when the determination of this step 448 is positive, that is, when abnormality is still detected with only No. 1 cylinder being operated, it is determined that No. 1 cylinder which is currently in operation is abnormal and that No. 4 cylinder which is additionally halted this time is possibly abnormal (step 452).

Moreover, when the determination of the above step 444 becomes negative (that is, when no abnormality has been detected during the reduced-cylinder operation by use of No. 1 and No. 4 cylinders), or when abnormality identification (above-described steps 446 to 452) relating to No. 1 and No. 4 cylinders is completed; then, a reduced-cylinder operation by use of No. 3 and No. 6 cylinders is executed (step 454). In addition, with the reduced-cylinder operation by use of No. 3 and No. 6 cylinders being performed, an abnormality detection processing similar to that of above-described step 100 is executed (step 456). When, as a result of that, the determination of this step 456 is positive (that is, when it can be judged that at least one of No. 3 and No. 6 cylinders is abnormal); hereafter, the processing of steps 458 to 464 similar to the case of above-described No. 1 and No. 4 cylinders are executed in order to further advance the identification of the abnormal cylinder(s) relating to No. 3 and No. 6 cylinders.

Moreover, when the determination of the above step 456 becomes negative (that is, when no abnormality is detected during the reduced-cylinder operation by use of No. 3 and No. 6 cylinders), or when abnormality identification (above-described steps 458 to 464) relating to No. 3 and No. 6 cylinders is completed; then, a reduced-cylinder operation by use of No. 5 and No. 2 cylinders is executed (step 466). In addition, with the reduced-cylinder operation by use of No. 5 and No. 2 cylinders being performed, an abnormality detection processing similar to that of above-described step 100 is executed (step 468). When, as a result of that, the determination of this step 468 is positive (that is, when it can be judged that at least one of No. 5 and No. 2 cylinders is abnormal); hereafter, the processing of steps 470 to 476 similar to the case of above-described No. 1 and No. 4 cylinders are executed in order to further advance the identification of the abnormal cylinder(s) relating to No. 5 and No. 2 cylinders.

According to the processing of the routine shown in FIGS. 17 to 19 so far described, even in a case where it is assumed that abnormality occurs in a plurality of cylinders of the internal combustion engine 120 which is a 6-cylinder engine, it becomes possible to identify the abnormal cylinder(s) at a sufficient level for practical use while suppressing the deterioration of the catalyst.

Moreover, in the processing of the above-described routine, the arrangement is made such that after the abnormality detection processing is executed for each of cylinder groups which are made up of a half number of cylinders (3 cylinders), it is successively determined whether or not abnormality is recognized in another sort of cylinder groups which are made up by collecting one cylinder from each of the cylinder groups. According to such a method, when abnormality is present only in either one of the two cylinder groups, it becomes possible to effectively identify abnormal cylinder(s) without the need of performing a single-cylinder operation (see FIG. 18). Moreover, even when abnormality is recognized in both of the cylinder groups, abnormality determination is performed during the operation in which the another sort of cylinder group is selected, prior to performing a single-cylinder operation. As a result of this, when it can be judged that no abnormality is present in the another sort of cylinder group at the stage of performing such a reduced-cylinder operation, it becomes possible to omit the identification of abnormal cylinder(s) relating to the another sort of cylinder group (see FIG. 19). As a result of this, the execution of reduced-cylinder operation is suppressed to a minimum necessary level, and thus, it becomes possible to well identify abnormal cylinder(s) at a sufficient level for practical use, by simply performing a single-cylinder operation for at most three cylinders.

Moreover, in the processing of the above-described routine, consideration is given such that to reduce the noise and vibration levels during the operation in which a partial cylinder is halted, a cylinder group in which explosion intervals are uniform is selected as the operating cylinder to perform cylinder halting. To be specific, for a cylinder group (No. 1, No. 3, and No. 5) which is first selected, and another sort of cylinder groups (No. 1 and No. 4, No. 3 and No. 6, and No. 5 and No. 2 cylinders) which are selected thereafter; three cylinders or two cylinders between which explosion intervals are uniform are selected. Because of this, it becomes possible to identify abnormal cylinder(s) while sufficiently suppressing the noise and vibration levels in the internal combustion engine 120 which is a 6-cylinder engine.

Note that in the fourth embodiment, which has been described above, the "first cylinder-halting execution means" in the above-described first or eighth aspect of the present invention, the "second cylinder-halting execution means" in the above-described first or eighth aspect of the present invention, the "abnormal cylinder-group determination means" in the above-described eighth aspect of the present invention, and the "in-cylinder-group abnormality identification means" in the above-described eighth or ninth aspect of the present invention are implemented by the ECU 22 executing the processing of above-described steps 402 and 406, the processing of above-described step 412, 422, 432, 442, 454 or 466, the processing of above-described step 410, and the processing of above-described steps 412 to 440, or steps 442 to 476, respectively.

Fifth Embodiment

Next, a fifth embodiment of the present invention will be described with reference to FIGS. 20 and 21.

Figure 20:
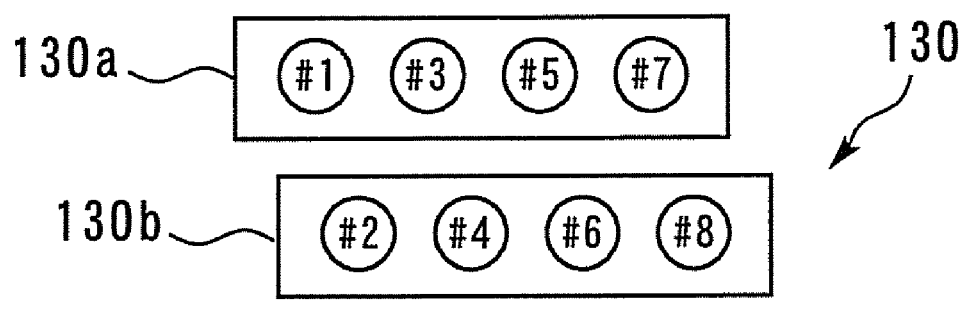
FIG. 20 is a diagram showing the arrangement and explosion sequence of each cylinder of an internal combustion engine 130 according to a fifth embodiment of the present invention.

FIG. 20 is a diagram showing the arrangement and explosion sequence of each cylinder of an internal combustion engine 130 according to the fifth embodiment of the present invention. As shown in FIG. 20, the internal combustion engine 120 of the present embodiment is supposed to be an 8-cylinder engine and, to be more specific, a V-type 8-cylinder engine including a total of eight cylinders (No. 1 to No. 8) in two banks 130a and 130b. Moreover, herein, four cylinders disposed in one bank 130a are referred to as No. 1, No. 3, No. 5, and No. 7 cylinders, and four cylinders disposed in the other bank 130b are referred to as No. 2, No. 4, No. 6, and No. 8 cylinders. Further, the explosion sequence of the internal combustion engine 130 is, as an example, No. 1 to No. 8, to No. 4, to No. 3, to No. 6, to No. 5, to No. 7 and to No. 2, and the explosion stroke is performed in this sequence at a uniform interval.

The internal combustion engine 130 of the present embodiment is configured basically in the same manner as the internal combustion engine 10 except that engine types are different from each other. That is, although not shown, it is supposed that a fuel injection valve is provided in each cylinder and a variable valve operating mechanism which can halt the intake and exhaust valves in the closed state for each cylinder. Moreover, it is supposed that an appropriate number of catalysts are disposed in an exhaust passage. Further, it is supposed that in a portion at the downstream of the integral part of the exhaust manifold of each bank 130a, 130b, and in a portion after the confluence of exhaust gases discharged from both the banks 130a and 130b; an A/F sensor (or O2 sensor) is disposed for detecting an air fuel ratio at those points.

[Abnormal Cylinder Identification Method of the Fifth Embodiment]

Figure 21:
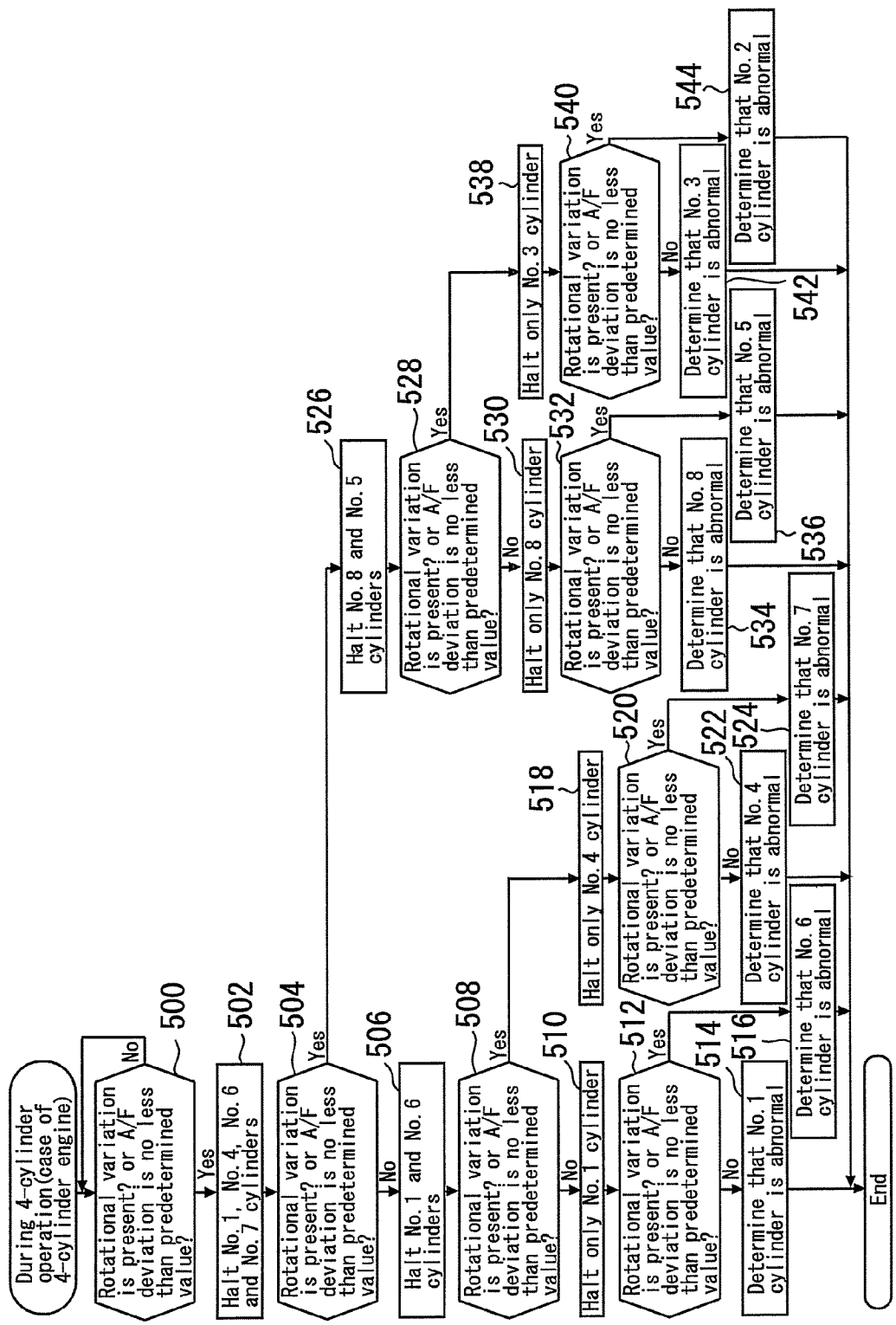
FIG. 21 is a flowchart illustrating a routine that is executed according to the fifth embodiment of the present invention.

FIG. 21 is a flowchart of the routine to be executed by the ECU 22 to implement an abnormal cylinder identification method according to the fifth embodiment of the present invention. Note that it is supposed that the present routine is executed when the internal combustion engine 130 which is an 8-cylinder engine is in an 8-cylinder (all-cylinder) operation. Further, in the present embodiment, description will be made on the processing in which it is assumed that abnormality occurs only in any one of the eight cylinders included in the internal combustion engine 130.

In the routine shown in FIG. 21, first, during an all-cylinder operation, an abnormality detection processing which is similar to that of above-described step 100 is executed (step 500). When, as a result of that, the determination of this step 500 is positive, that is, when it is recognized that abnormality has occurred in any of the eight cylinders which are currently in operation; No. 1, No. 4, No. 6 and No. 7 cylinders are halted (step 502). That is, a reduced-cylinder operation by use of No. 8, No. 3, No. 5, and No. 2 cylinders is executed.

Next, with No. 1, No. 4, No. 6 and No. 7 cylinders being halted, an abnormality detection processing similar to that of above-described step 100 is executed (step 504). When, as a result of that, the determination of this step 504 becomes negative, that is, when abnormality becomes undetected in association with the halting of No. 1, No. 4, No. 6 and No. 7 cylinders; it can be judged that not No. 8, No. 3, No. 5, and No. 2 cylinders which are currently in operation, but any one of No. 1, No. 4, No. 6 and No. 7 cylinders which are currently halted is abnormal. For this reason, in this case, the following series of processing of steps 506 to 524 are executed in order to identify which of No. 1, No. 4, No. 6 and No. 7 cylinders is abnormal. The following processing of steps 506 to 524 are the same as those of steps 102 to 120 in the routine shown in above-described FIG. 13 except that target cylinders are No. 1, No. 4, No. 6 and No. 7 cylinders. Therefore, detailed description thereof is omitted here.

On the other hand, when the determination of above-described step 504 is positive, that is, when abnormality is still detected with No. 1, No. 4, No. 6 and No. 7 cylinders being halted, it can be judged that any one of No. 8, No. 3, No. 5, and No. 2 cylinders which are currently in operation is abnormal. Therefore, in this case, the following series of processing of steps 526 to 544 are executed in order to identify which of No.

8, No. 3, No. 5, and No. 2 cylinders is abnormal. The following processing of steps 526 to 544 are the same as those of steps 102 to 120 in the routine shown in above-described FIG. 13 except that target cylinders are No. 8, No. 3, No. 5, and No. 2 cylinders. Therefore, detailed description thereof is omitted here.

According to the processing of the routine shown in FIG. 21 described above, in a case where it is assumed that abnormality occurs in any one of cylinders of the internal combustion engine 130 which is an 8-cylinder engine, it becomes possible to accurately identify the abnormal cylinder while suppressing the deterioration of the catalyst disposed in the exhaust passage.

Moreover, in the processing of the above-described routine, the arrangement is made such that when abnormality is recognized in any of cylinders, first, determination is made whether or not abnormality is recognized in one of the cylinder groups made up of a half number of cylinders (four cylinders) (for example, No. 1, No. 4, No. 6 and No. 7), and thereafter, as the abnormal cylinder identification process progresses, the number of cylinders to be halted is successively decreased from 4 cylinders to 2 cylinders (for example, another sort of cylinder group made up of No. 1 and No. 4 cylinders), and further to one cylinder. As a result of this, it is possible to effectively decrease the number of the execution of the single-cylinder halting, and to effectively reduce the cylinder halting time. Thus, it becomes possible to accurately identify the abnormal cylinder while suppressing adverse effects on the driving performance of the vehicle and the noise and vibration characteristics of the internal combustion engine.

Moreover, in the processing of the above-described routine, the arrangement is made such that the above-described cylinder group which is to be selected when identifying the abnormal cylinder and the above-described another sort of cylinder groups are both made up of the cylinders between which halting intervals are uniform. According to such a method, it becomes possible to identify the abnormal cylinder while suppressing, to a minimum, the deterioration of the noise and vibration characteristics associated with the cylinder halting. To be more specific, it becomes possible to accurately identify the abnormal cylinder through a total of three halts including: one halt for each of the cylinder group and another sort of cylinder group, which have been selected to suppress, to a minimum, the deterioration of the noise and vibration characteristics; and one halt for only one cylinder in the other cylinder group. That is, it becomes possible to accurately identify the abnormal cylinder while minimizing the number of executions and the operation time of the single-cylinder halting operation which may cause the deterioration of the noise and vibration characteristics.

Note that in the fifth embodiment, which has been described above, the "first cylinder-halting execution means" in the above-described first, third or tenth aspect of the present invention, the "second cylinder-halting execution means" in the above-described first, third or tenth aspect of the present invention, the "abnormal cylinder-group determination means" in the above-described third or tenth aspect of the present invention, the "second abnormal cylinder-group determination means" in the above-described fourth or tenth aspect of the present invention, and the "in-cylinder-group abnormality identification means" in the above-described third or tenth aspect of the present invention are implemented by the ECU 22 executing the processing of above-described step 502, the processing of above-described step 506 (or 526), or step 510 (or 518, 530, or 538), the processing of above-described step 504, the processing of above-described step 508 or 528, and the processing of above-described steps 512 to 516, steps 520 to 524, steps 532 to 536, or steps 540 to 544, respectively.

Sixth Embodiment

Next, a sixth embodiment of the present invention will be described with reference to FIG. 22.

The system of the present embodiment can be implemented by using the hardware configuration shown in FIGS. 2 to 12, and 20, and causing the ECU 22 to execute the routine shown in FIG. 22 described below, in place of the routine shown in FIG. 21.

[Abnormal Cylinder Identification Method of the Sixth Embodiment]

In the fifth embodiment described above, the abnormal cylinder identification method which assumes the case in which abnormality occurs only in any one of the cylinders in the 8-cylinder internal combustion engine 130 has been described. In contrast to this, in the present embodiment, description will be made on an abnormal cylinder identification method which assumes a case in which abnormality occurs in a plurality of cylinders of the internal combustion engine 130.

Figure 22:
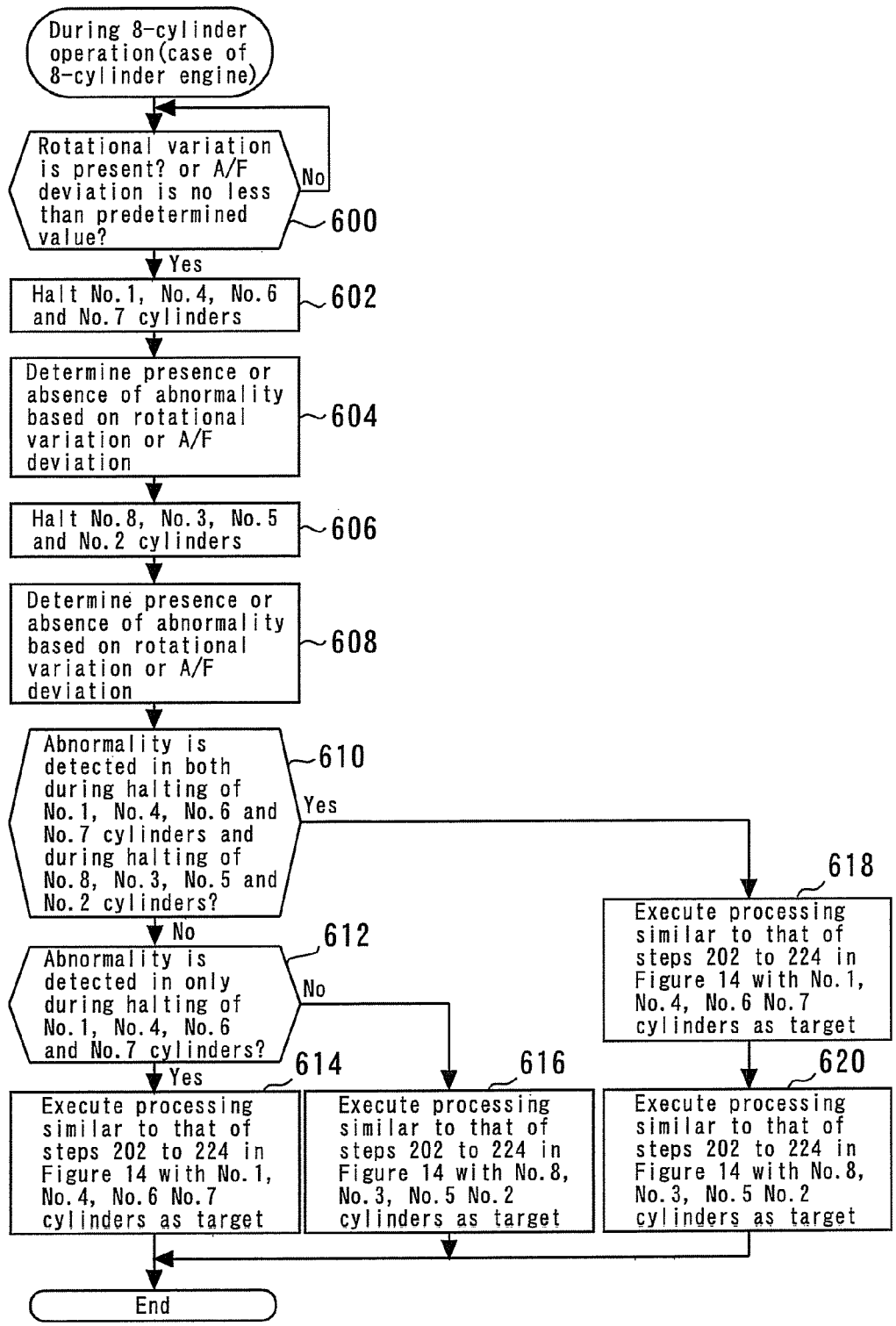
FIG. 22 is a flowchart illustrating a routine that is executed according to a sixth embodiment of the present invention.

FIG. 22 is a flowchart of the routine to be executed by the ECU 22 to implement an abnormal cylinder identification method according to the sixth embodiment of the present invention.

In the routine shown in FIG. 22, first, an abnormality detection processing similar to that of above-described step 100 is executed during an all-cylinder operation (step 600). When, as a result of that, the determination of this step 600 is positive, that is, when it is recognized that abnormality has occurred in any of eight cylinders which are currently in operation; No. 1, No. 4, No. 6 and No. 7 cylinders are halted (step 602). That is, a reduced-cylinder operation using No. 8, No. 3, No. 5, and No. 2 cylinders is executed.

Next, with No. 1, No. 4, No. 6 and No. 7 cylinders being halted, an abnormality detection processing similar to that of above-described step 100 is executed (step 604). Then, No. 8, No. 3, No. 5, and No. 2 cylinders are halted (step 606). That is, a reduced-cylinder operation by use of No. 1, No. 4, No. 6 and No. 7 cylinders is executed. Thereafter, with No. 8, No. 3, No. 5, and No. 2 cylinders being halted, an abnormality detection processing similar to that in above-described step 100 is executed (step 608).

Next, based on the result of the abnormality detection processing of above-described steps 604 and 608, it is determined whether or not abnormality is detected in both during the halting of No. 1, No. 4, No. 6 and No. 7 cylinders and during the halting of No. 8, No. 3 No. 5, and No. 2 cylinders (step 610). When, as a result of that, the determination of this step 610 is negative, that is, when abnormality is detected only either of during the halting of No. 1, No. 4, No. 6 and No. 7 cylinders and during the halting of No. 8, No. 3, No. 5, and No. 2 cylinders; then, it is determined whether or not abnormality is detected only during the halting of No. 1, No. 4, No. 6 and No. 7 cylinders (step 612).

When the determination in above-described step 612 is positive, that is, when it can be determined that abnormality is detected only during the halting of No. 1, No. 4, No. 6 and No. 7 cylinders, it can be judged that at least one of No. 1, No. 4, No. 6 and No. 7 cylinders is abnormal. Therefore, in this case, the processing similar to that of steps 202 to 224 of the routine shown in above-described FIG. 14 is executed in order to further advance the identification of abnormal cylinder(s) relating to No. 1, No. 4, No. 6 and No. 7 cylinders (step 614). Since the processing of this step 614 is similar to that of above described steps 202 to 224 except that No. 1, No. 4, No. 6 and No. 7 cylinders are targets to be processed, detailed description thereof is omitted here.

On the other hand, when the determination of this step 612 is negative, that is, when it can be judged that an abnormality has been detected only during the halting of No. 8, No. 3, No. 5, and No. 2 cylinders, it can be judged that at least one of No. 8, No. 3, No. 5, and No. 2 cylinders is abnormal. Therefore, in this case, the processing similar to that of steps 202 to 204 of the routine shown in above-described FIG. 14 is executed in order to further advance the identification of abnormal cylinder(s) relating to No. 8, No. 3, No. 5, and No. 2 cylinders (step 616). Since the processing of this step 616 is similar to that of above described steps 202 to 224 except that No. 8, No. 3, No. 5, and No. 2 cylinders are targets to be processed, detailed description thereof is omitted here.

Moreover, when the determination in above-described step 610 is positive, that is, when abnormality has been detected both of during the halting of No. 1, No. 4, No. 6 and No. 7 cylinders and during the halting of No. 8, No. 3, No. 5, and No. 2 cylinders; then, a processing to identify abnormal cylinder(s) relating to No. 1, No. 4, No. 6 and No. 7 cylinders (step 618) and the processing to identify abnormal cylinder(s) relating to No. 8, No. 3, No. 5, and No. 2 cylinders (step 620) are successively executed. Note that the processing of step 618 is the same as that of above-described step 614 and the processing of step 620 is the same as that of above-described step 616.

According to the routine shown in FIG. 22 described above, even in a case where it is assumed that abnormality occurs in a plurality of cylinders of the internal combustion engine 130 which is an 8-cylinder engine, it becomes possible to identify abnormal cylinder(s) at a sufficient level for practical use while suppressing the deterioration of the catalyst.

Moreover, in the processing of the above-described routine, the arrangement is made such that first, the abnormality detection processing is executed for each of two cylinder groups made up of a half number of cylinders (4 cylinders), and further, after making it clear whether an abnormality-occurring cylinder is included in either one of the cylinder groups, or included in both of them; identification of abnormal cylinder(s) is executed as needed for the cylinders included in each cylinder group. According to such a method, it becomes possible to effectively identify abnormal cylinder (s) while suppressing the number of halts of a partial cylinder for identifying an abnormal cylinder. Moreover, when identifying an abnormal cylinder in a cylinder group, prior to the execution of a single-cylinder operation, abnormality determination is performed during the operation in which the another sort of cylinder group is selected as the cylinder to be halted. As a result of this, when it can be judged that no abnormality is present in the another sort of cylinder group at the stage when such a reduced-cylinder operation has been performed, the identification of abnormal cylinder(s) relating to the another sort of cylinder group can be omitted. Thus, the execution of the single-cylinder operation is suppressed to a necessary minimum, as a result of which it becomes possible to successfully identify abnormal cylinder(s) at a sufficient level for practical use by simply performing single-cylinder operation for at most four cylinders.

Moreover, in the processing of the above-described routine as well, consideration is given such that cylinder halting is performed by selecting a cylinder group in which halting intervals are uniform in order to reduce the noise and vibration during the halting operation of the partial cylinder. To be specific, for either of the cylinder group (No. 1, No. 4, No. 6 and No. 7, or No. 8, No. 3, No. 5, and No. 2) which is first selected, and another sort of cylinder groups (No. 1 and No. 6, No. 4 and No. 7, No. 8 and No. 5, or No. 3 and No. 2) which is selected thereafter, four cylinders or two cylinders between which halting intervals are uniform are selected. As a result of this, it becomes possible to identify abnormal cylinder(s) while sufficiently suppressing the noise and vibration levels in the internal combustion engine 130 which is an 8-cylinder engine.

Note that in the sixth embodiment, which has been described above, the "first cylinder-halting execution means" in the above-described first, third or eleventh aspect of the present invention, the "second cylinder-halting execution means" in the above-described first, third or eleventh aspect of the present invention, the "abnormal cylinder-group determination means" in the above-described third or eleventh aspect of the present invention, the "second abnormal cylinder-group determination means" in the above-described fourth or eleventh aspect of the present invention, and the "in-cylinder-group abnormality identification means" in the above-described third or eleventh aspect of the present invention are implemented by the ECU 22 executing the processing of above-described steps 602 and 606, the processing of above-described steps 614, 616, or steps 618 and 620, the processing of above-described steps 610 and 612, the processing of above-described steps 614, 616, or steps 618 and 620, and the processing of above-described steps 614, 616, or steps 618 and 620, respectively.

Seventh Embodiment

Next, a seventh embodiment of the present invention will be described with reference to FIG. 23.

The system of the present embodiment can be implemented by using the hardware configuration, for example, shown in FIG. 1 and FIGS. 2 to 12, and causing the ECU 22 to execute the routine shown in FIG. 23 described below as well as the routine shown in FIG. 13.

[Abnormal Cylinder Identification Method of the Seventh Embodiment]

In a case where there is a request for decreasing the torque, for example, during deceleration of the internal combustion engine 10, when a predetermined execution condition is established, the processing to stop the fuel supply to each cylinder, that is, a fuel cut is performed. The abnormal cylinder identification method of the present embodiment is to be executed at the time of such request for the execution of the fuel cut.

Figure 23:
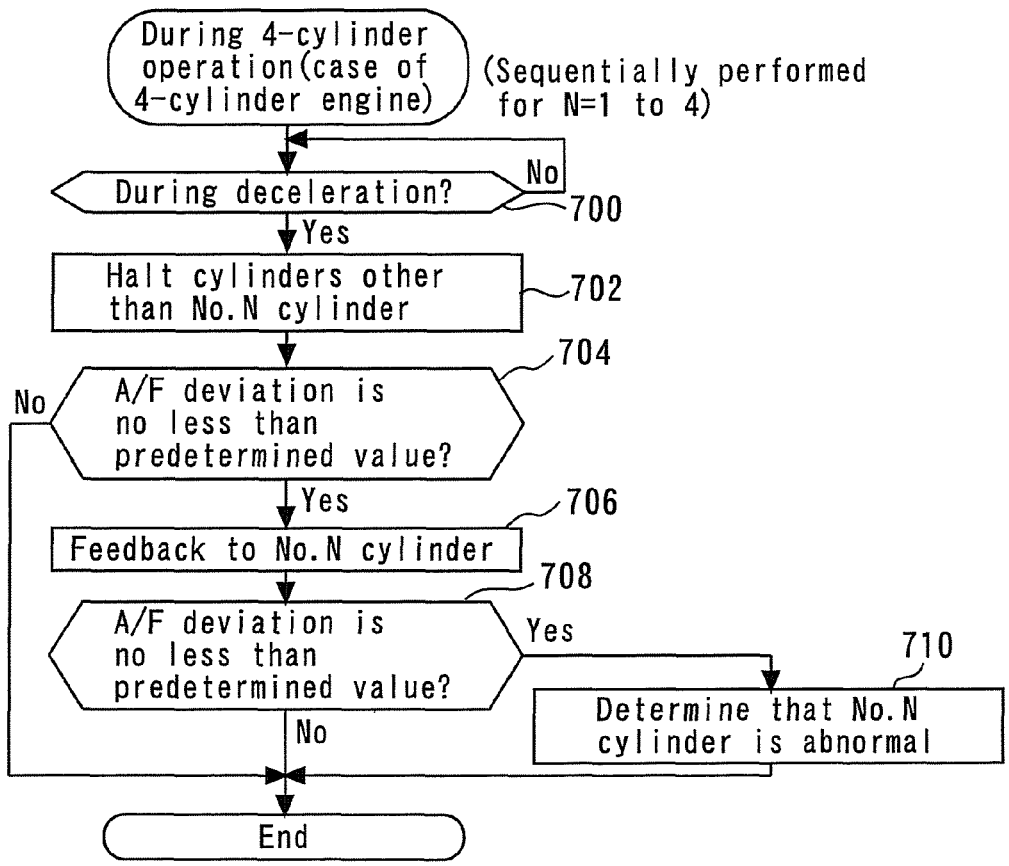
FIG. 23 is a flowchart illustrating a routine that is executed according to a seventh embodiment of the present invention.

FIG. 23 is a flowchart of the routine to be executed by the ECU 22 to implement an abnormal cylinder identification method according to the seventh embodiment of the present invention.

In the routine shown in FIG. 23, first, a determination is made on whether or not the internal combustion engine 10 is decelerating based on the output of, for example, a throttle opening sensor included therein (step 700).

When, as a result of that, it is determined that the engine is in deceleration, in other words, it can be judged that there is a request for the execution of the fuel cut, three cylinders excepting a predetermined No. N cylinder are halted (step 702). To be more specific, fuel supply is halted in the target cylinders to be halted and the operations of the intake and exhaust valves are halted in the closed state.

Next, in a situation in which only the above-described No. N cylinder is operated, it is determined, based on the output of the A/F sensor 16, whether or not the air fuel ratio of the exhaust gas discharged from the No. N cylinder is deviated by no less than a predetermined value with respect to a predetermined control target air fuel ratio (step 704). When, as a result, it is determined that there is an A/F deviation of no less than a constant value, abnormality is recognized in the No. N cylinder and therefore a feedback to No. N cylinder is performed so that the detected A/F deviation is eliminated (step 706). To be more specific, in the internal combustion engine 10, an air fuel ratio feedback control which corrects the fuel injection quantity to each cylinder according to the output of the A/F sensor 16 and the like is being performed so that the air fuel ratio of the exhaust gas supplied to the catalyst 14 is maintained at a predetermined control target air fuel ratio. In this step 706, the fuel injection quantity to No. N cylinder is corrected so that the above-described A/F deviation is eliminated.

Next, after the execution of the correction by above-described step 706, it is determined whether or not there is an A/F deviation of no less than the above-described predetermined value in the No. N cylinder (step 708). When, as a result of that, it is determined that the A/F deviation of no less than the above-described constant value still exists, it is finally determined that No. N cylinder is abnormal (step 710).

In the present routine, when it is determined in above-described step 700 that the engine is in deceleration, the processing of above-described steps 702 to 710 are sequentially performed for No. 1 to No. 4 cylinders included in the internal combustion engine 10.

According to the processing of the routine shown in FIG. 23 described so far, it is possible to identify the abnormal cylinder(s) while suppressing the deterioration of the catalyst 14, by utilizing the situation in which a fuel cut is executed during deceleration. As a result of this, by arranging the present routine to be executed along with the processing of the first to sixth embodiments shown in above-described FIG. 13 and the like, it becomes possible to sufficiently ensure a chance for detecting an abnormal cylinder during the operation of the internal combustion engine 10. Moreover, according to the above routine, when abnormality is recognized in any of the cylinders, it is possible to perform the correction of the fuel injection quantity for No. N cylinder in which an abnormality has been detected, prior to the abnormality determination. Further, according to the processing of the above-described routine, by performing the detection of the abnormal cylinder(s) during deceleration, in which no torque request is made to the internal combustion engine 10, it is possible to sufficiently exclude the effect of halting a part of the cylinders on the noise and vibration.

Note that in the seventh embodiment, which has been described above, the "fuel cut request determination means" in the above-described twelfth aspect of the present invention, the "third cylinder halting execution means" in the above-described twelfth aspect of the present invention, and the "second abnormal cylinder identification means" in the above-described twelfth aspect of the present invention are implemented by the ECU 22 executing the processing of above-described step 700, the processing of above-described step 702, and the processing of above-described steps 708 and 710, respectively.

Furthermore, in the seventh embodiment, which has been described above, the "air fuel ratio correction means" in the above-described thirteenth aspect of the present invention is implemented by the ECU 22 executing the processing of above-described step 706.

Eighth Embodiment

Next, an eighth embodiment of the present invention will be described with reference to FIG. 24.

The system of the present embodiment can be implemented by using the hardware configuration, for example, shown in FIG. 1 and FIGS. 2 to 12, and causing the ECU 22 to execute the routine shown in FIG. 24 described below as well as the routine shown in FIG. 13.

[Abnormality Content Identification Method of the Eighth Embodiment]

As already described, abnormalities which may occur in each cylinder of the internal combustion engine 10 include misfire, A/F imbalance, and others. In the present embodiment, description will be made on a method to identify which of misfire or A/F imbalance is the abnormality which has occurred in the internal combustion engine 10.

Figure 24:
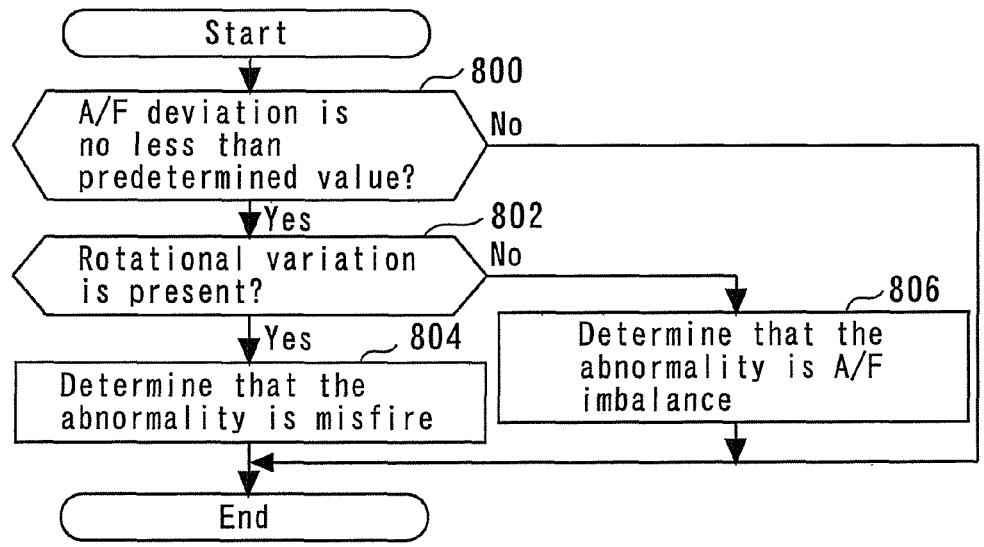
FIG. 24 is a flowchart illustrating a routine that is executed according to an eighth embodiment of the present invention.

FIG. 24 is a flowchart of the routine to be executed by the ECU 22 to implement an abnormality content identification method according to the eighth embodiment of the present invention.

In the routine shown in FIG. 24, first, a determination is made on whether or not the deviation of detection value of the A/F sensor 16 with respect to a control target air fuel ratio is no less than a predetermined value for abnormality detection by a similar method to that of the processing performed in above-described step 100 (step 800). When, as a result of that, a deviation of no less than the above-described predetermined value is recognized, then it is determined whether or not the rotational variation of the crankshaft is no less than a predetermined value for misfire detection (step 802).

When the determination of above-described step 802 is positive, that is, when it can be judged that both of the A/F deviation and the rotational variation of the crankshaft are at abnormal levels, it is determined that the abnormality of the internal combustion engine 10, which has been detected this time, is a misfire (step 804). On the other hand, when the determination of above-described step 802 is negative, that is, when it can be judged that although an A/F deviation at an abnormal level is recognized, a rotational variation of the crankshaft at an abnormal level is not recognized, it is determined that the abnormality of the internal combustion engine 10, which has been detected this time, is an A/F imbalance (step 806).

When a misfire occurs in any of the cylinders, since combustion does not take place in the misfired cylinder, the air fuel ratio of the exhaust gas from the misfired cylinder becomes significantly deviated toward the lean side. Moreover, since torque is not generated in the misfired cylinder, a rotational variation of the crankshaft takes place at an abnormal level. On the other hand, in the case of A/F imbalance, although the air fuel ratio of the exhaust gas discharged from the imbalanced cylinder is shifted toward the rich side or the lean side, since combustion is occurring in the cylinder, a large rotational variation of the crankshaft does not take place compared with at the time of misfiring.

Therefore, according to the routine process shown in FIG. 24 described so far, it becomes possible to identify whether an abnormality which has occurred in any of the cylinders of the internal combustion engine 10 is a misfire or an A/F imbalance, based on the presence or absence of an A/F deviation of no less than a predetermined value and the presence or absence of a rotational variation of the crankshaft of no less than a predetermined value. With such processing of the above-described routine being executed in combination with the abnormal cylinder identification method of the first to seventh embodiments described above, it becomes possible to accurately identify the cylinder where a misfire or an A/F imbalance has occurred.

Note that in the eighth embodiment, which has been described above, the "first abnormality evaluation index value determination means" in the above-described fourteenth aspect of the present invention, the "second abnormality evaluation index value determination means" in the above-described fourteenth aspect of the present invention, and the "abnormality content identification means" in the above-described fourteenth aspect of the present invention are implemented by the ECU 22 executing the processing of above-described step 802, above-described step 800, and above-described steps 800 to 806, respectively.

The invention claimed is:

1. A control apparatus for an internal combustion engine including a variable valve operating mechanism, comprising:
   a fuel injection valve which is capable of injecting fuel into each cylinder;
   a variable valve operating mechanism which is capable of halting an operation(s) of at least one valve of an intake valve and an exhaust valve in a closed state independently for each cylinder;
   abnormality detection means which acquires an abnormality evaluation index value during an operation of the internal combustion engine and, based on the abnormality evaluation index value, detects an abnormality which has occurred in at least one cylinder of the internal combustion engine;
   first cylinder-halting execution means which, when the abnormality is detected by the abnormality detection means, executes a cylinder halting to perform a halting of fuel supply and a halting of the operation of the at least one valve in the closed state, with a first partial cylinder made up of at least two cylinders as a target;
   second cylinder-halting execution means which, after the cylinder halting by the first cylinder-halting execution means, changes cylinders to be halted, and thereafter executes a cylinder halting with a second partial cylinder made up of at least one cylinder as a target; and
   abnormal cylinder identification means which identifies an abnormality-occurring cylinder based on a change in the abnormality evaluation index value associated with the changing of the cylinder to be halted, by the second cylinder-halting execution means.

2. The control apparatus for the internal combustion engine including the variable valve operating mechanism according to claim 1,
   wherein the second cylinder-halting execution means includes halted-cylinder-number reduction execution means which decreases a number of the cylinders to be halted as the identification of the abnormality-occurring cylinder proceeds.

3. The control apparatus for the internal combustion engine including the variable valve operating mechanism according to claim 1,
   wherein the first cylinder-halting execution means selects one or both of two cylinder groups in which halting intervals or explosion intervals are uniform or closest to uniform, as the first partial cylinder to execute the cylinder halting,
   wherein the abnormal cylinder identification means includes abnormal cylinder-group determination means which determines whether or not the abnormality-occurring cylinder is included in one or both of the cylinder groups, based on the abnormality evaluation index value at the time of the cylinder halting targeted for the first partial cylinder,
   wherein the second cylinder-halting execution means selects a partial cylinder in the cylinder group where it is determined that the abnormality-occurring cylinder is included, as the second partial cylinder to execute the cylinder halting, and
   wherein the abnormal cylinder identification means includes in-cylinder-group abnormality identification means which identifies the abnormality-occurring cylinder in the cylinder group where it is determined that the abnormality-occurring cylinder is included, based on the abnormality evaluation index value at the time of the cylinder halting targeted for the second partial cylinder.

4. The control apparatus for the internal combustion engine including the variable valve operating mechanism according to claim 3,
   wherein when there are a plurality of another sort of cylinder groups in which halting intervals or explosion intervals are uniform or closest to uniform in the cylinder group where it is determined that the abnormality-occurring cylinder is included, the second cylinder-halting execution means selects at least one of the another sort of cylinder groups as the second partial cylinder to perform the cylinder halting,
   wherein the abnormal cylinder identification means includes second abnormal cylinder-group determination means which determines whether or not an abnormality-occurring cylinder is included in at least one of the another sort of cylinder groups, based on the abnormality evaluation index value at the time of the cylinder halting targeted for the second partial cylinder,
   wherein the second cylinder-halting execution means selects a partial cylinder in the another sort of cylinder group where it is determined that the abnormality-occurring cylinder is included, as a third partial cylinder to execute the cylinder halting, and
   wherein the in-cylinder-group abnormality identification means identifies the abnormality-occurring cylinder in the another sort of cylinder group where it is determined that the abnormality-occurring cylinder is included, based on the abnormality evaluation index value at the time of the cylinder halting targeted for the third partial cylinder.

5. The control apparatus for the internal combustion engine including the variable valve operating mechanism according to claim 1,
   wherein the internal combustion engine is an internal combustion engine including four cylinders,
   wherein the first cylinder-halting execution means selects one of two cylinder groups made up of two cylinders between which halting intervals are uniform or closest to uniform, as the first partial cylinder to execute the cylinder halting,
   wherein the abnormal cylinder identification means includes abnormal cylinder-group determination means which determines in which of the cylinder groups the abnormality-occurring cylinder is included, based on the abnormality evaluation index value at the time of the cylinder halting targeted for the first partial cylinder,
   wherein the second cylinder-halting execution means selects any one cylinder in the cylinder group where it is determined that the abnormality-occurring cylinder is included, as the second partial cylinder to execute the cylinder halting, and
   wherein the abnormal cylinder identification means includes in-cylinder-group abnormality identification means which identifies the abnormality-occurring cylinder in the cylinder group where it is determined that the abnormality-occurring cylinder is included, based on the abnormality evaluation index value at the time of the cylinder halting targeted for the second partial cylinder.

6. The control apparatus for the internal combustion engine including the variable valve operating mechanism according to claim 1,
wherein the internal combustion engine is an internal combustion engine including four cylinders,
wherein the first cylinder-halting execution means successively selects two cylinder groups made up of two cylinders between which halting intervals are uniform or closest to uniform, as the first partial cylinder to execute the cylinder halting,
wherein the abnormal cylinder identification means includes abnormal cylinder-group determination means which determines whether or not the abnormality-occurring cylinder is included in one or both of the cylinder groups, based on the abnormality evaluation index value at the time of the cylinder halting targeted for the first partial cylinder,
wherein the second cylinder-halting execution means selects three cylinders other than any one cylinder in the cylinder group where it is determined that the abnormality-occurring cylinder is included, as the second partial cylinder to execute the cylinder halting, and
wherein the abnormal cylinder identification means includes in-cylinder-group abnormality identification means which identifies the abnormality-occurring cylinder in the cylinder group where it is determined that the abnormality-occurring cylinder is included, based on the abnormality evaluation index value at the time of the cylinder halting targeted for the second partial cylinder.

7. The control apparatus for the internal combustion engine including the variable valve operating mechanism according to claim 1,
wherein the internal combustion engine is an internal combustion engine including six cylinders,
wherein the first cylinder-halting execution means selects one of two cylinder groups made up of three cylinders between which explosion intervals are uniform or closest to uniform, as the first partial cylinder to execute cylinder halting,
wherein the abnormal cylinder identification means includes abnormal cylinder-group determination means which determines in which of the cylinder groups the abnormality-occurring cylinder is included, based on the abnormality evaluation index value at the time of the cylinder halting targeted for the first partial cylinder,
wherein the second cylinder-halting execution means selects, for at least one of three another sort of cylinder groups made up of two cylinders between which explosion intervals are uniform or closest to uniform, four cylinders other than two cylinders included in the another sort of cylinder group, as the second partial cylinder to execute the cylinder halting, and
wherein the abnormal cylinder identification means includes in-cylinder-group abnormality identification means which identifies the abnormality-occurring cylinder, based on a determination result of whether or not the abnormality-occurring cylinder is included in the another sort of cylinder group based on the abnormality evaluation index value at the time of the cylinder halting targeted for the second partial cylinder, and a determination result by the abnormal cylinder-group determination means.

8. The control apparatus for the internal combustion engine including the variable valve operating mechanism according to claim 1,
wherein the internal combustion engine is an internal combustion engine including six cylinders,
wherein the first cylinder-halting execution means successively selects two cylinder groups made up of three cylinders between which explosion intervals are uniform or closest to uniform, as the first partial cylinder to execute the cylinder halting,
wherein the abnormal cylinder identification means includes abnormal cylinder-group determination means which determines whether or not the abnormality-occurring cylinder is included in one or both of the cylinder groups, based on the abnormality evaluation index value at the time of the cylinder halting targeted for the first partial cylinder,
wherein the second cylinder-halting execution means successively selects, for three another sort of cylinder groups made up of two cylinders between which explosion intervals are uniform or closest to uniform, four cylinders other than two cylinders included in the another sort of cylinder groups, as the second partial cylinder to execute the cylinder halting, and
wherein the abnormal cylinder identification means includes in-cylinder-group abnormality identification means which, when it is determined that the abnormality-occurring cylinder is included in only one of the cylinder groups, identifies the abnormality-occurring cylinder based on: a determination result of whether or not the abnormality-occurring cylinder is included in the another sort of cylinder groups, based on the abnormality evaluation index value at the time of the cylinder halting targeted for the second partial cylinder; and a determination result by the abnormal cylinder-group determination means.

9. The control apparatus for the internal combustion engine including the variable valve operating mechanism according to claim 8,
wherein the second cylinder-halting execution means further selects any one cylinder of the another sort of cylinder group where it is determined that the abnormality-occurring cylinder is included, as a third partial cylinder to execute the cylinder halting, and
wherein when it is determined that both of the cylinder groups include the abnormality-occurring cylinder, the in-cylinder-group abnormality identification means identifies the abnormality-occurring cylinder in the another sort of cylinder group where it is determined that the abnormality-occurring cylinder is included, based on the abnormality evaluation index value at the time of the cylinder halting targeted for the third partial cylinder.

10. The control apparatus for the internal combustion engine including the variable valve operating mechanism according to claim 1,
wherein the internal combustion engine is an internal combustion engine including eight cylinders,
wherein the first cylinder-halting execution means selects one of two cylinder groups made up of four cylinders between which halting intervals are uniform or closest to uniform, as the first partial cylinder to execute the cylinder halting,
wherein the abnormal cylinder identification means includes abnormal cylinder-group determination means which determines in which of the cylinder groups the abnormality-occurring cylinder is included, based on the abnormality evaluation index value at the time of the cylinder halting targeted for the first partial cylinder,
wherein the second cylinder-halting execution means selects one of two another sort of cylinder groups made up of two cylinders between which halting intervals are uniform or closest to uniform, as the second partial cylinder to execute the cylinder halting, in the cylinder group where it is determined that the abnormality-occurring cylinder is included, wherein the abnormal cylinder identification means includes second abnormal cylinder-group determination means which determines in which of the another sort of cylinder groups the abnormality-occurring cylinder is included, based on the abnormality evaluation index value at the time of the cylinder halting targeted for the second partial cylinder, wherein the second cylinder-halting execution means further selects any one cylinder in the another sort of cylinder group where it is determined that the abnormality-occurring cylinder is included, as a third partial cylinder to execute the cylinder halting, and wherein the abnormal cylinder identification means includes in-cylinder-group abnormality identification means which identifies the abnormality-occurring cylinder in the another sort of cylinder group where it is determined that the abnormality-occurring cylinder is included, based on the abnormality evaluation index value at the time of the cylinder halting targeted for the third partial cylinder.

11. The control apparatus for the internal combustion engine including the variable valve operating mechanism according to claim 1, wherein the internal combustion engine is an internal combustion engine including eight cylinders, wherein the first cylinder-halting execution means successively selects two cylinder groups made up of four cylinders between which halting intervals are uniform or closest to uniform, as the first partial cylinder to execute the cylinder halting, wherein the abnormal cylinder identification means includes abnormal cylinder-group determination means which determines whether or not the abnormality-occurring cylinder is included in one or both of the cylinder groups, based on the abnormality evaluation index value at the time of the cylinder halting targeted for the first partial cylinder, wherein the second cylinder-halting execution means successively selects two another sort of cylinder groups made up of two cylinders between which halting intervals are uniform or closest to uniform, as the second partial cylinder to execute the cylinder halting, in the cylinder group where it is determined that the abnormality-occurring cylinder is included, wherein the abnormal cylinder identification means includes second abnormal cylinder-group determination means which determines whether or not the abnormality-occurring cylinder is included in at least one of the two another sort of cylinder groups included in the cylinder group where it is determined that the abnormality-occurring cylinder is included, based on the abnormality evaluation index value at the time of the cylinder halting targeted for the second partial cylinder, wherein the second cylinder-halting execution means selects three cylinders other than any one cylinder in the another sort of cylinder group where it is determined that the abnormality-occurring cylinder is included, as a third partial cylinder to execute the cylinder halting, and wherein the abnormal cylinder identification means includes in-cylinder-group abnormality identification means which identifies the abnormality-occurring cylinder in the another sort of cylinder group where it is determined that the abnormality-occurring cylinder is included, based on the abnormality evaluation index value at the time of the cylinder halting targeted for the third partial cylinder.

12. The control apparatus for the internal combustion engine including the variable valve operating mechanism according to claim 1, further including:

fuel cut request determination means which determines a presence or absence of an execution request for fuel cut; and third cylinder halting execution means which executes a cylinder halting targeted for other cylinders other than a predetermined one cylinder, with the predetermined one cylinder being successively changed, when the execution request for fuel cut is recognized, and wherein the abnormal cylinder identification means includes second abnormal cylinder identification means which identifies the abnormality-occurring cylinder based on the abnormality evaluation index value at the time of the cylinder halting by the third cylinder halting execution means.

13. The control apparatus for the internal combustion engine including the variable valve operating mechanism according to claim 12, wherein the abnormality detection means is means which uses an air fuel ratio of exhaust gas flowing through an exhaust passage as the abnormality evaluation index value, and detects the abnormality based on the deviation amount of the air fuel ratio with respect to a predetermined determination value, and wherein the control apparatus for the internal combustion engine further comprises air fuel ratio correction means which corrects the air fuel ratio of the exhaust gas discharged from the abnormality-occurring cylinder identified by the second abnormal cylinder identification means so that the abnormality detected by the abnormality detection means is eliminated.

14. The control apparatus for the internal combustion engine including the variable valve operating mechanism according to claim 1, wherein the abnormality detection means includes:

first abnormality evaluation index value determination means which uses a rotational variation of a crankshaft as the abnormality evaluation index value and determines whether or not the rotational variation of the crankshaft is no less than a first predetermined determination value; and second abnormality evaluation index value determination means which uses an air fuel ratio of exhaust gas flowing in an exhaust passage being the abnormality evaluation index value, and determines whether or not the deviation amount of the air fuel ratio is no less than a second predetermined determination value, and wherein the control apparatus for the internal combustion engine further comprises abnormality content identification means which determines that the abnormality is a misfire when the rotational variation of the crankshaft is no less than the first determination value, and that the abnormality is an air fuel ratio imbalance when, although the rotational variation of the crankshaft is not no less than the first determination value, the deviation amount of the air fuel ratio is no less than the second determination value.

15. A control apparatus for an internal combustion engine including a variable valve operating mechanism, comprising:

a fuel injection valve which is capable of injecting fuel into each cylinder;

a variable valve operating mechanism which is capable of halting an operation(s) of at least one valve of an intake valve and an exhaust valve in a closed state independently for each cylinder;

an abnormality detection device which acquires an abnormality evaluation index value during an operation of the internal combustion engine and, based on the abnormality evaluation index value, detects an abnormality which has occurred in at least one cylinder of the internal combustion engine;

a first cylinder-halting execution device which, when the abnormality is detected by the abnormality detection device, executes a cylinder halting to perform a halting of fuel supply and a halting of the operation of the at least one valve in the closed state, with a first partial cylinder made up of at least two cylinders as a target;

a second cylinder-halting execution device which, after the cylinder halting by the first cylinder-halting execution device, changes cylinders to be halted, and thereafter executes a cylinder halting with a second partial cylinder made up of at least one cylinder as a target; and an abnormal cylinder identification device which identifies an abnormality-occurring cylinder based on a change in the abnormality evaluation index value associated with the changing of the cylinder to be halted, by the second cylinder-halting execution device.

\* \* \* \* \*